US008677181B2

(12) United States Patent
Nakayama et al.

(10) Patent No.: US 8,677,181 B2
(45) Date of Patent: Mar. 18, 2014

(54) STORAGE APPARATUS AND METHOD OF DETECTING POWER FAILURE IN STORAGE APPARATUS

(75) Inventors: Yosuke Nakayama, Odawara (JP); Tetsuya Inoue, Odawara (JP); Tsutomu Koga, Matsuda (JP); Hiroshi Suzuki, Sagahihara (JP)

(73) Assignee: Hitachi, Ltd., Tokyo (JP)

( * ) Notice: Subject to any disclaimer, the term of this patent is extended or adjusted under 35 U.S.C. 154(b) by 489 days.

(21) Appl. No.: 13/059,203

(22) PCT Filed: Dec. 13, 2010

(86) PCT No.: PCT/JP2010/072369
§ 371 (c)(1),
(2), (4) Date: Feb. 15, 2011

(87) PCT Pub. No.: WO2012/081071
PCT Pub. Date: Jun. 21, 2012

(65) Prior Publication Data
US 2012/0151262 A1    Jun. 14, 2012

(51) Int. Cl.
*G06F 11/00* (2006.01)
(52) U.S. Cl.
USPC .............................................. 714/22; 714/14
(58) Field of Classification Search
USPC ..................................................... 714/14, 22
See application file for complete search history.

(56) References Cited

U.S. PATENT DOCUMENTS

| | | | |
|---|---|---|---|
| 7,047,427 B2 * | 5/2006 | Suzuki et al. ................. | 713/300 |
| 7,231,545 B2 * | 6/2007 | Elliott et al. .................... | 714/22 |
| 7,809,983 B2 * | 10/2010 | Suzuki et al. .................. | 714/14 |
| 8,037,362 B2 * | 10/2011 | Suzuki et al. .................. | 714/42 |
| 8,312,325 B2 * | 11/2012 | Suzuki et al. .................. | 714/42 |
| 8,392,756 B2 * | 3/2013 | Nakayama et al. ............ | 714/14 |
| 2003/0200471 A1 | 10/2003 | Suzuki et al. | |
| 2006/0238032 A1 * | 10/2006 | Nitta .............................. | 307/64 |
| 2009/0031150 A1 * | 1/2009 | Koga ........................... | 713/300 |
| 2009/0063901 A1 * | 3/2009 | Suzuki et al. ................... | 714/25 |

FOREIGN PATENT DOCUMENTS

| | | |
|---|---|---|
| JP | 2003-316520 | 7/2003 |
| JP | 2007-293448 | 11/2007 |
| JP | 2009-10655 | 1/2009 |

OTHER PUBLICATIONS

International Search Report mailed Feb. 22, 2011 in International Application No. PCT/JP2010/072369 (9 pgs.).

* cited by examiner

*Primary Examiner* — Bryce Bonzo
*Assistant Examiner* — Elmira Mehrmanesh
(74) *Attorney, Agent, or Firm* — Foley & Lardner LLP

(57) ABSTRACT

A storage apparatus includes a drive unit device including multiple storage drives, a drive interface unit and a power supply unit, a storage controller including multiple processing units and a drive control interface unit, a recording part recording whether a relevant data input/output process was successful for each of multiple data paths, and a failure detection unit performing a process which, when one processing unit determines the data input/output process not being performed successfully, determines whether a result of the data input/output process performed by other processing units is recorded in the recording part within a predetermined period of time after an abnormality of the relevant data input/output process is recorded, and, when the first processing unit detecting the abnormality determines that the data input/output process abnormality is recorded, provides an instruction to stop the data input/output processes to the drive unit device in which the abnormality is detected.

20 Claims, 27 Drawing Sheets

POWER FAILURE CHECK TABLE 1500

| PATH ID | STATUS TYPE | DRIVE UNIT 1 | | | DRIVE UNIT 2 | | | | | DRIVE UNIT 3 | | | DRIVE UNIT n | | |
|---|---|---|---|---|---|---|---|---|---|---|---|---|---|---|---|
| | | ZZ11 | ... | ZZ1n | ZZ21 | ZZ22 | ZZ23 | ZZ24 | ... | ZZ2n | ZZ31 | ... | ZZ3n | ZZn1 | ... | ZZnn |
| A | I/O STATUS | | | | * | | | | | | | | | | | |
| A | LSI STATUS | | | | | | | | | | | | | | | |
| B | I/O STATUS | | | | | * | | | | | | | | | | |
| B | LSI STATUS | | | | | | | | | | | | | | | |
| C | I/O STATUS | | | | | | | | | * | | | | * | | |
| C | LSI STATUS | | | | | | | | | | | | | | | |
| D | I/O STATUS | | ○ | | | | | | | | | | | | | |
| D | LSI STATUS | | | | | | | | | | | | | | | |
| E | I/O STATUS | | | | | | | * | | | | | | | | |
| E | LSI STATUS | | | | | | | | | | * | | | | | |
| F | I/O STATUS | ○ | | | | | * | | | | | | | | | |
| F | LSI STATUS | | | | | | | | | | | | | | | |
| G | I/O STATUS | | | | | | | * | | | | | | | | |
| G | LSI STATUS | | | | | | | | | | | | | | | |
| H | I/O STATUS | | | ○ | | | | | | | | | | * | | |
| H | LSI STATUS | | | | | | | | | | | | | | | |
| POWER SUPPLY BORDER | | AC11/AC12 | | | AC21/AC22 | | | | | | AC31/AC32 | | | ACn1/ACn2 | | |
| BLOCKAGE INFORMATION | | | | | TENTATIVE BLOCKAGE | | | | | | TENTATIVE BLOCKAGE | | | TENTATIVE BLOCKAGE | | |

POWER FAILURE CHECK TABLE 1500

| PATH ID | STATUS TYPE | DRIVE UNIT 1 | | | DRIVE UNIT 2 | | | | | ... | DRIVE UNIT 3 | | | ... | DRIVE UNIT n | | |
|---|---|---|---|---|---|---|---|---|---|---|---|---|---|---|---|---|---|
| | | ZZ11 | ... | ZZ1n | ZZ21 | ZZ22 | ZZ23 | ZZ24 | ... | ZZ2n | ZZ31 | ... | ZZ3n | ... | ZZn1 | ... | ZZnn |
| A | I/O STATUS | | | | * | | | | | | | | | | | | |
| B | I/O STATUS | | | | | OK | | | | | | | | | | | |
| C | I/O STATUS | | | | | | | | | | | | | | * | | |
| D | I/O STATUS | | | | | | | * | | | | | | | | | |
| E | I/O STATUS | | | | | | | | | | * | | | | | | |
| F | I/O STATUS | | | | | | | | | | | | * | | | | |
| G | I/O STATUS | | | | | | | | | * | | | | | | | |
| H | I/O STATUS | | | | | | | | | | | | | | | | * |
| POWER SUPPLY BORDER | | AC11/AC12 | | | AC21/AC22 | | | | | | AC31/AC32 | | | | ACn1/ACn2 | | |
| BLOCKAGE INFORMATION | | NORMAL USE | | | NORMAL USE | | | | | | NORMAL USE | | | | NORMAL USE | | |

1501  1502  1503  1510  1520

POWER FAILURE CHECK TABLE 1500

| PATH ID | STATUS TYPE | DRIVE UNIT 1 | | | DRIVE UNIT 2 | | | | | DRIVE UNIT 3 | | | ... | DRIVE UNIT n | | |
|---|---|---|---|---|---|---|---|---|---|---|---|---|---|---|---|---|
| | | ZZ11 | ... | ZZ1n | ZZ21 | ZZ22 | ZZ23 | ZZ24 | ... | ZZ2n | ZZ31 | ... | ZZ3n | ... | ZZn1 | ... | ZZnn |
| A | I/O STATUS | | | | * | | | | | | | | | ... | | | |
| A | LSI STATUS | | | | | | | | | | | | | ... | | | |
| B | I/O STATUS | | | | | * | | | | | | | | ... | | | |
| B | LSI STATUS | | | | | | | | | | | | | ... | | | |
| C | I/O STATUS | | | | | | | | | * | | | | ... | * | | |
| C | LSI STATUS | | | | | | | | | | | | | ... | | | |
| D | I/O STATUS | | | | | | * | * | | | | | | ... | | | |
| D | LSI STATUS | | | | | | | | | | | | | ... | | | |
| E | I/O STATUS | | | | | | | OK | | | | | | ... | | | |
| E | LSI STATUS | | | | | | | | | | | | | ... | | | |
| F | I/O STATUS | | | | | | * | | | | * | | | ... | | | |
| F | LSI STATUS | | | | | | | | | | | | | ... | | | |
| G | I/O STATUS | | | | | | | | | * | | | | ... | | | |
| G | LSI STATUS | | | | | | | | | | | | | ... | | | |
| H | I/O STATUS | | | | | | | | | | | | | ... | | | * |
| H | LSI STATUS | | | | | | | | | | | | | ... | | | |
| POWER SUPPLY BORDER | | AC11/AC12 | | | AC21/AC22 | | | | | | AC31/AC32 | | | ... | ACn1/ACn2 | | |
| BLOCKAGE INFORMATION | | NORMAL USE | | | NORMAL USE | | | | | | NORMAL USE | | | ... | NORMAL USE | | |

FIG. 21

DRIVE CONFIGURATION MANAGEMENT TABLE 1700

| DRIVE UNIT 1 | | | |
|---|---|---|---|
| PATH ID | DRIVE I/F BOARD ID | DRIVE ID | ECC CONFIGURATION |
| A | 111 | A21 | D |
| B | 211 | A22 | D |
| C | 311 | B11 | D |
| D | 411 | C11 | D |
| E | 112 | A12 | D |
| F | 212 | B12 | D |
| G | 312 | C12 | D |
| H | 412 | D12 | P |

STORAGE APPARATUS AND METHOD OF DETECTING POWER FAILURE IN STORAGE APPARATUS

TECHNICAL FIELD

This invention relates to a storage apparatus and a method of detecting a power failure in a storage apparatus, and particularly relates to a storage apparatus and a method of detecting a power failure in a storage apparatus, which can detect a failure occurring in a power supply system of the storage apparatus accurately and rapidly and deal with the same in a more simplified hardware configuration.

BACKGROUND ART

A storage apparatus is an apparatus which including storage media such as hard disk drives (Hard Disk Drives, hereinafter referred to as "HDDs") and semiconductor storage drives (Solid State Drives, hereinafter referred to as "SSDs"), and providing storage areas of data to be processed by applications and other programs running on a host computer or the like, and is also referred to as a disk subsystem.

In recent years, there has been an increasing demand that storage apparatuses should achieve further power saving, space saving, higher-density packaging, and cost down for manufacturing and maintenance. A power failure of a storage apparatus is a serious failure that may lead to a system down in a data center or the like which is required to operate continuously with high reliability. In order to surely and quickly detect and then deal with such a power failure, a configuration has been employed in which a dedicated power supply monitor circuit is provided to a drive control board for an HDD, and is coupled to a control processor in a disk controller or the like with a dedicated interface (wiring), for example.

This configuration provided with the dedicated power supply monitor circuit and the dedicated interface, however, cannot sufficiently meet the foregoing demand, for example, for achievement of higher-density packaging, and cost down for manufacturing.

In this regard, Patent Literature 1 proposes a configuration including a power control circuit applied to a power supply control device comprising an HDD comprising multiple systems of Fibre Channel interface ports comprising multiple systems, an HDD drive unit of Fibre Channel controllers including Fibre Channel interfaces with this HDD and Fibre Channel control interfaces, and an HDD control logical unit comprising multiple systems of HDD control logic controlling read/write access to the HDD, wherein each of the Fibre Channel controllers includes a power supply control circuit which performs the power supply control of the HDD drive unit by using the control signals for the Fibre Channel control interface provided from each of the HDD control logical to each of the Fibre Channel control interfaces.

CITATION LIST

Patent Literature

[Patent Literature 1] Japanese Patent Application Laid-open Publication No. 2003-316520

SUMMARY OF INVENTION

Technical Problem

However, according to the configuration proposed by the Patent Literature 1, as the information related to power failures is transmitted and received by the same route as normal data I/O commands, in case where a power failure occurs, it takes time to identify the part where the failure occurred and retry the command affected by the failure, which might inevitably deteriorate the system performance. Furthermore, the above-mentioned failure recovery processing requires to be engaged in by the maintenance personnel with technical knowledge, which is also a problem from the perspective of the market demand of maintenance cost reduction.

This invention has been made in view of the above-mentioned problems, and one of the objects of the present invention is to provide a storage apparatus and a method for detecting power failures in a storage apparatus, which can detect failures occurring in the power supply system of the storage apparatus accurately and rapidly and dealing with the same in a more simplified hardware configuration.

Solution to Problem

In order to solve the foregoing and other problems, a first aspect of the present invention is a storage apparatus comprising: a drive unit device including a plurality of storage drives, a drive interface unit and a power supply unit, the storage drives being configured to provide a physical storage area for creating a logical storage area to be used by an external apparatus, the drive interface unit being configured to input and output data to and from the storage drives, the power supply unit being configured to supply operation power to the storage drives and the drive interface unit; a storage controller including a plurality of processing units and a drive control interface unit, the processing units being configured to perform a data input/output process via the drive interface unit, the data input/output process including a process of writing data from the external apparatus into the storage drives and a process of reading data out of the storage drives, the drive control interface unit being configured to issue a command to the drive interface unit in response to a request from each of the processing units; a failure existence/non-existence recording part configured to record, for every attempt of each of the plurality of the processing units to perform the data input/output process via a plurality of data paths which are communication paths for performing data transfer to and from the drive interface unit of the drive unit device, whether the relevant data input/output process was successful for each of the data paths; and a failure detection unit configured to perform a power failure detection process which, in a case where one of the plurality of processing units has determined that the data input/output process with the drive interface unit has not been performed successfully, determines whether a result of the data input/output process performed by each of the other processing units has been recorded in the failure existence/non-existence recording part within a predetermined period of time after an abnormality of the relevant data input/output process has been recorded in the failure existence/non-existence recording part, and, in a case where the first processing unit which has detected the abnormality in the data input/output process has determined that the data input/output process abnormality is recorded in the failure existence/non-existence recording part for all the data paths, provides an instruction to stop the data input/output processes to the drive unit device in which the data input/output process abnormality has been detected and other drive unit devices coupled downstream of the relevant drive unit device.

Other matters such as objects and solutions disclosed in the present application will be clarified in the following section of "Description of Embodiments" and the drawings.

Advantageous Effects of Invention

According to this invention, a storage apparatus and a method for detecting power failures of the storage apparatus which can detect failures occurring in the power supply system of the storage apparatus accurately and rapidly and deal with the same in a more simplified hardware configuration are provided.

BRIEF DESCRIPTION OF DRAWINGS

FIG. 19 is a diagram showing an exemplary configuration of the power failure check table 1500.

FIG. 20 is a diagram showing an exemplary configuration of the power failure check table 1500.

FIG. 21 is a diagram showing an exemplary configuration of the power failure check table 1500.

FIG. 28 is a diagram showing an exemplary configuration of a drive configuration management table 1700.

DESCRIPTION OF EMBODIMENTS

Hereinafter, with reference to the accompanying drawings, the present invention will be described based on embodiments of the present invention.

Overview of Configuration of Storage Apparatus

Storage Apparatus Structure

Figure 1:
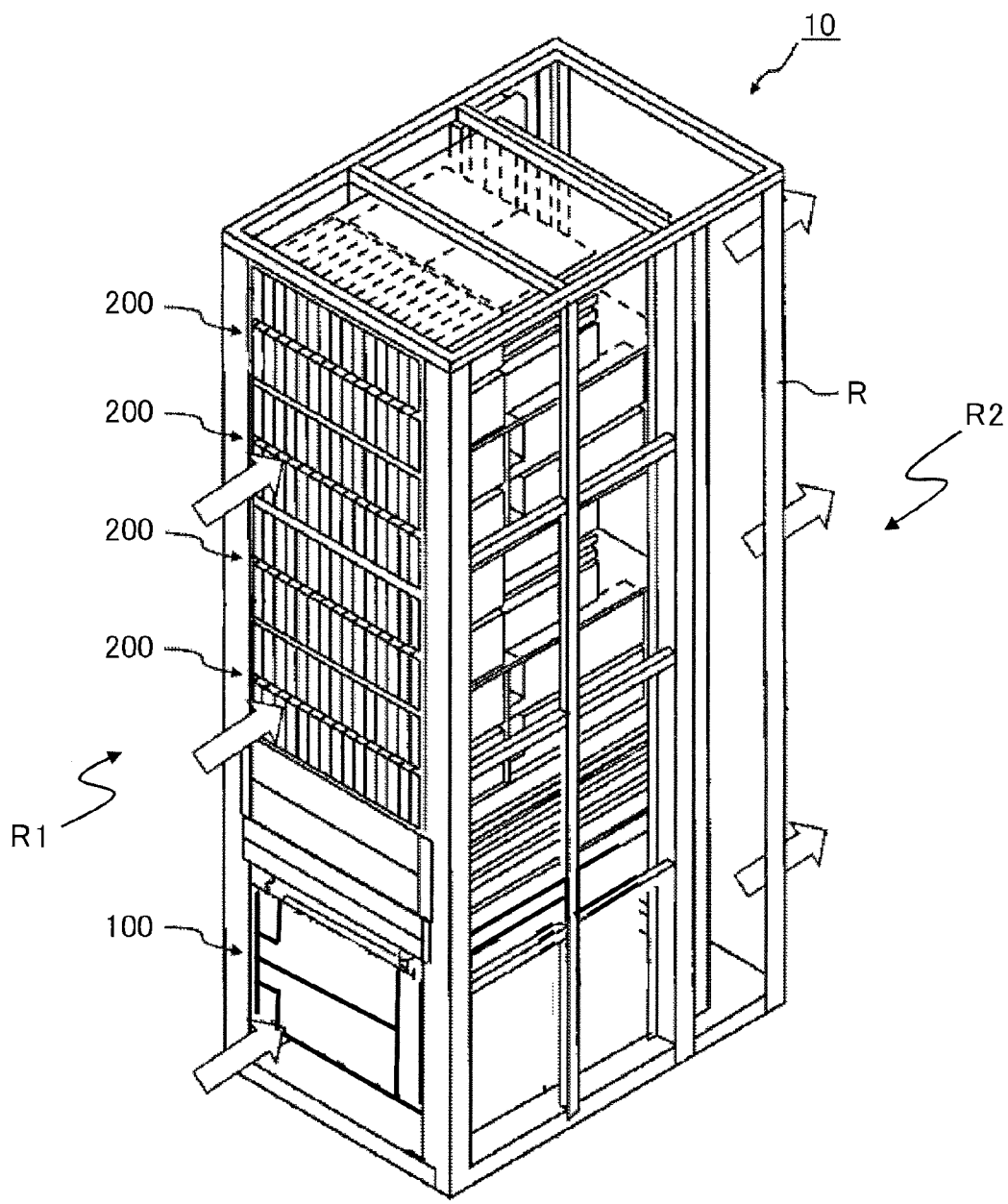
FIG. 1 is a view of an external appearance of a storage apparatus 10 according to an embodiment of the present invention.

Firstly, the structure of a storage apparatus 10 related to the present embodiment is described. FIG. 1 shows an exemplary external appearance of the storage apparatus 10 according to an embodiment of the present invention.

The storage apparatus 10 includes a rack R to which a controller 100 and a plurality of drive units 200 are detachably attached. Note that, FIG. 1 shows the configuration in which the controller 100 is provided in the lowest portion of the storage apparatus 10 and the plurality of drive units 200 are arranged in a stacked manner above the controller 100. However, the arrangement of the controller, 100 and the drive units 200 is not limited to the example shown in FIG. 1.

The rack R includes a front-face portion R1 and a rear-face portion R2 located at the rear side of the front-face portion R1. As shown by thick outlined arrows in FIG. 1, cooling air for cooling the inside of the controller 100 and the drive units 200 is taken in through the front-face portion R1 side of the rack R and is discharged from the rear-race portion R2 side of the rack R.

Figure 2:
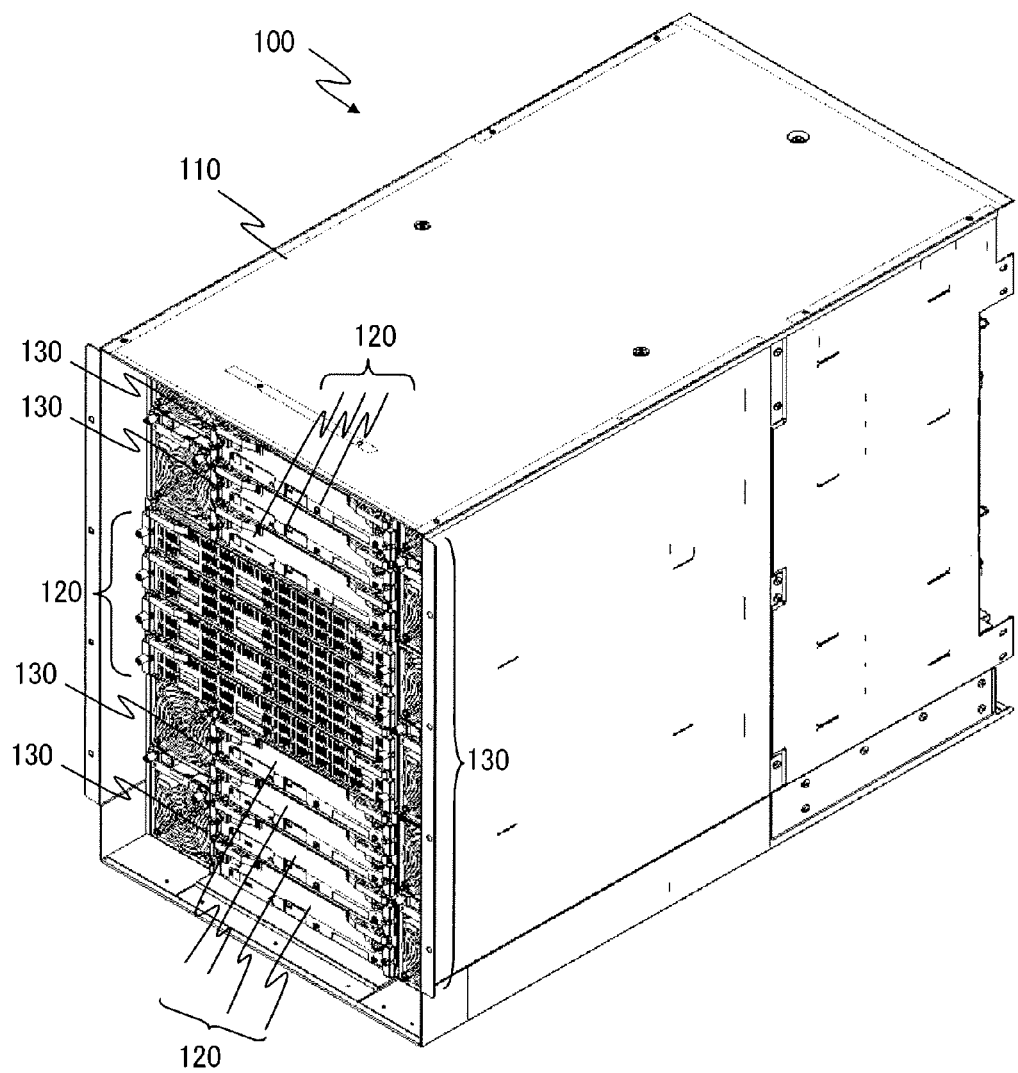
FIG. 2 is a view of an external appearance of a controller device 100 included in the storage apparatus 10 according to an embodiment of the present invention.

FIG. 2 shows an exemplary external appearance of the controller 100 included in the storage apparatus 10. The controller 100 has a rack-mount type structure with a substantially rectangular parallelepiped shape, and includes a chassis 110 having a substantially rectangular tubular shape by assembling a plurality of substantially rectangular metal plates, circuit modules 120 housed inside the chassis 110, and fans 130 for cooling these circuit modules 120. As shown in FIG. 1, the controller 100 is housed in the rack R together with the other drive units 200.

The circuit modules 120 are circuit units, each of which housing circuit components such as processors, memories, network switches, and network interface circuits for executing data input/output to/from storage drives which will be described later. The fans 130 are electrical cooling fans capable of providing a predetermined design performance, and are, for example, arranged in a pattern shown in FIG. 2.

The chassis 110 is configured with such a shape and dimensions that twelve units of circuit modules 120 can be housed in a vertically stacked manner, but the configuration of the chassis 110 is not specifically limited to the illustrated configuration.

Figure 3:
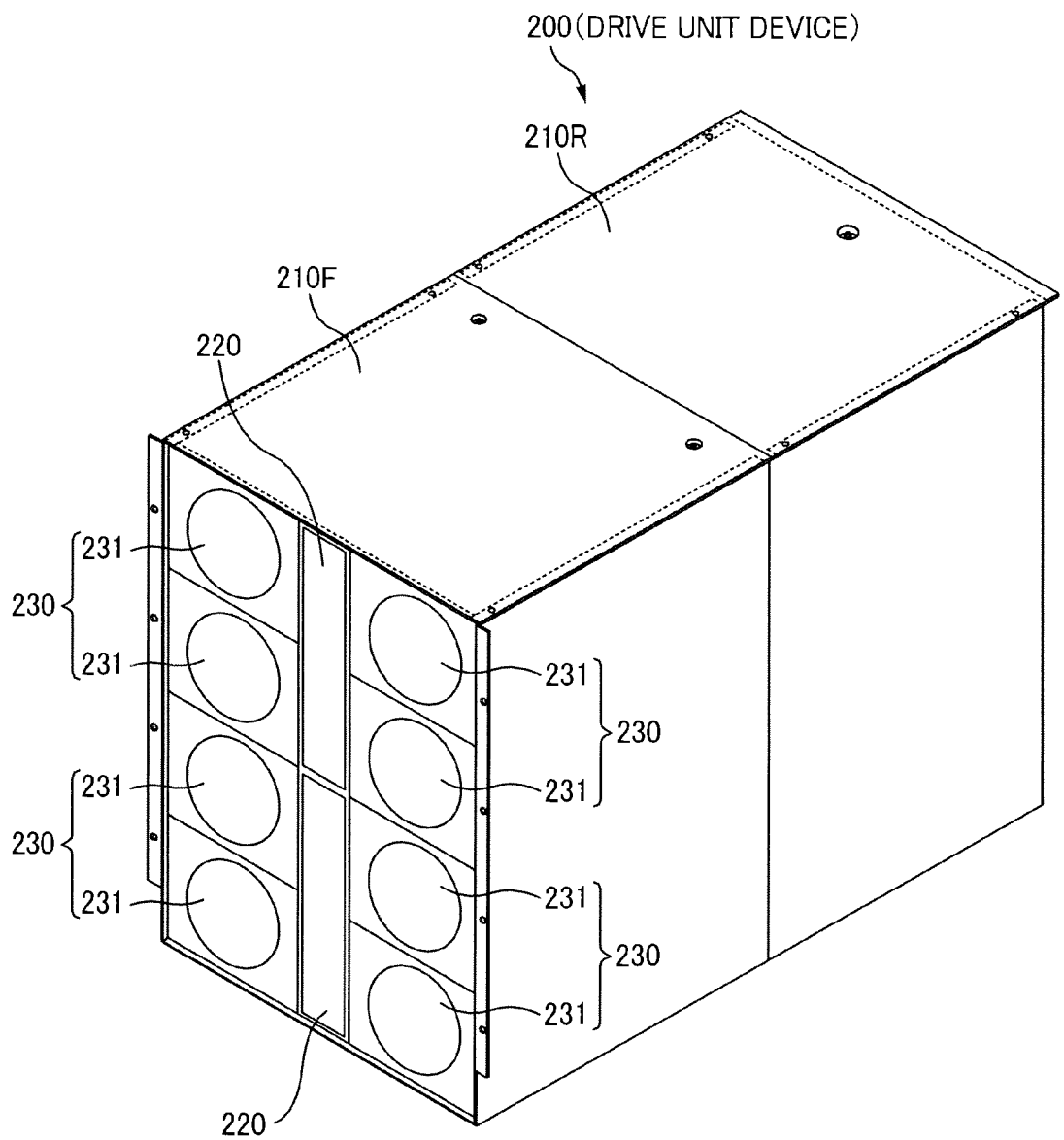
FIG. 3 is a view of an external appearance of a drive unit devices 200 included in the storage apparatus 10 according to an embodiment of the present invention.

FIG. 3 shows an exemplary external appearance of one of the drive units 200 included in the storage apparatus 10. The drive unit 200 houses therein a storage drive such as a HDD that provides a physical storage area as the storage apparatus 10, an input-output control circuit thereof, and the like. The drive unit 200 has, similarly to the controller 100, a rack-mount structure with a substantially rectangular parallelepiped shape, and includes chassis 210F, 210R each having a substantially rectangular tubular shape by assembling a plurality of substantially rectangular metal plates.

Each of the chassis 210F, 210R includes an internally-mounted storage drive (not shown), a circuit unit (not shown) including a storage drive control circuit, fans 231 and fan driving power supply units (hereinafter referred to as "fan power supplies") 220 for driving the fans 231. The chassis 210F and 210R are configured with practically the same internal device layouts with each other, and are mutually coupled to each other at their rear faces to form a single drive unit 200.

The fans 231 are, as described in regard to the fans 130 of the controller 100, electrical fans for generating air flows for cooling the internal devices. In the drive units 200, the fans 231 have a function of cooling the embedded storage drive and storage drive control circuits. Any type of fans appropriately selected from fans, such as AC fans or DC fans generally used for cooling information processing devices can be used as the fans 231. Furthermore, the fans 231 comprehensively include air blowing devices which may be called by other names such as a blower.

In the drive unit 200 illustrated in FIG. 3, a fan unit 230 is formed by mounting two fans 231 on a unit member made of a synthetic resin or the like, and two fan units 230 are attached on each of the right and left sides of the front face of each of the chassis 210F, 210R. Therefore, both the chassis 210F, 210R have a configuration in which four fans 231 arranged vertically are attached on either side of the front face of the chassis. The fan power supplies 220 are placed in a center portion of the front face of the chassis 210F, 210R in such a manner as to be interposed between the fans 231 in right-left direction. Two of the fan power supplies 220 are arranged vertically, and supply operation power to each of the respective fans 231 in a dual system. For the fan power supplies 220, any type appropriate for controlling the adopted fans 231 may be selected.

System Configuration of Storage Apparatus 10

Figure 4:
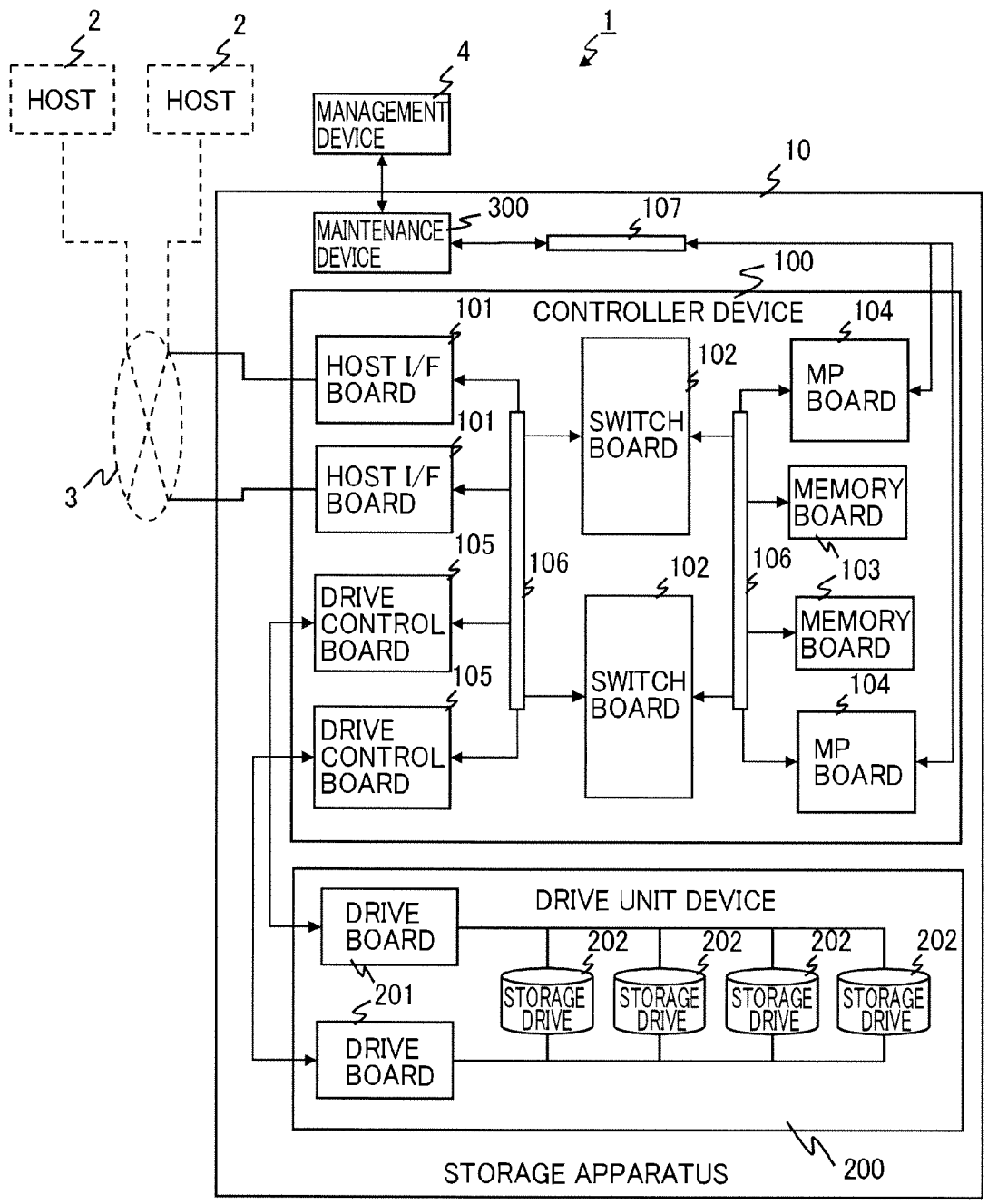
FIG. 4 is a hardware configuration diagram of the storage apparatus 10.

Next, a system configuration of the storage apparatus 10 of the present embodiment will be described. FIG. 4 shows an exemplary hardware configuration of the storage apparatus 10. The storage apparatus 10 forms a storage system 1 by being communicatively coupled to one or more host computers (hereinafter referred to as "hosts") 2 via a communication network 3.

The communication network 3 includes LAN (Local Area Network), SAN (Storage Area Network), WAN (Wide Area Network), the Internet, a public telecommunication network, a dedicated line, and others. Communications through the communication network 3 are performed in conformity with the protocols such as TCP/IP, iSCSI (internet Small Computer System Interface), the Fibre Channel Protocol, and others.

The host 2 (external apparatus) is an information processing device (computer) which utilizes logical storage area (data storage area) provided by the storage apparatus 10. The host 2 is configured with a personal computer, a main frame, an office computer, and others. When accessing the storage areas, the host 2 sends the storage apparatus 10 a data frame (hereinafter referred to as "a frame") containing a data I/O requests (a data write request, a data read or the like) to.

The storage apparatus 10 accesses a storage medium in response to the above-mentioned I/O request transmitted from the host 2, and transmits data or a response to the host 2. The storage apparatus 10 comprises a controller 100 and a drive unit 200. In the example of FIG. 4, the storage apparatus 10 is provided with a single controller 100 and a single drive unit 200. Two or more of controller devices 100 and/or two or more of drive unit devices 200 may be provided and coupled, however, to improve the processing performance.

The controller 100 (storage controller) processes a data I/O request transmitted from the host 2, and executes processes such as data write and data read together with the drive unit 200. In the present embodiment, the controller 100 includes host interface boards (hereinafter referred to as "host I/F boards") 101, switch boards 102, memory board 103, MP (Microprocessor) boards 104, and drive control boards 105. These boards are communicatively coupled to each other via internal network 106 using communication protocols such as Fibre channel, iSCSI and TCP/IP.

The host I/F boards 101 each receives a frame sent from the host 2, and the host 2 a frame containing a response (for example, read data, read completion report, and write completion report) resulting from the processing for the data I/O request contained in the received frames. Note that the description below is provided on the assumption that the frame is a Fibre Channel frame (FC frame (FC: Fibre Channel)).

The switch boards 102 are each configured with a high-speed crossbar switch, for example, and perform switching of transfer of control commands and data among the host I/F boards 101, the memory boards 103, the MP boards 104, and the drive control boards 105.

The memory boards 103 are configured with a fast access RAMS (Random Access Memories), for example. The memory boards 103 is provided with a cache memory which stores therein data such as data to be written to the storage drives (hereinafter referred to as "write data"), and data read from the storage drives (hereinafter referred to as "read data"), and is also provided with a shared memory which stores therein various types of information (tables and others) used for controlling the storage apparatus 10.

The MP boards 104 (processing unit boards) are each configured to perform a process related to data transfer between the host I/F boards 101, the drive control boards 105, and the cache memory of the memory boards 103, in accordance with the above-mentioned data I/O request included in the frame received by the host I/F boards 101. The MP board 104 performs processes such as: delivering data (data read from storage drive 202 described later or data to be written to the storage drives 202) between the host I/F board 101 and the drive control board 105 via the cache memory, staging data to be stored in the cache memory (reading data from the storage drive 202) or destaging data stored in the cache memory (writing data to the storage drives 202). Furthermore, in the present embodiment, a microprocessors (hereinafter referred to as "MPs") (processing unit) mounted on the MP board 104 performs the power supply monitoring and power failure detection. The process for power supply monitoring and power failure detection processing by the MP will be described later.

The drive control boards 105 communicate with the drive boards 201 in the drive unit 200 when reading data from the storage drives 202 and writing data to the storage drives 202.

The drive unit device 200 includes the drive boards 201 and a plurality of storage drives 202. Each of the storage drives 202 is a storage medium such as an HDD or SSD having an interface such as SAS (Serial Attached SCSI), SATA (Serial ATA) FC (Fibre Channel), PATA (Parallel ATA) or SCSI, for example. The drive board 201 performs a process of receiving data from the drive control board 105 of the controller device 100, and storing the data into the storage drive 202; a process for a control command received from the drive control board 105 of the controller device 100; and other processes. Note that, the drive boards 201 and the storage drives 202 may be provided in any number based on the design requirement or the like, regardless of the example shown in FIG. 4.

The drive unit device 200 provides a host 2 with storage areas in units of logical storage areas provided by controlling the storage drives 202 in a method such as RAID (Redundant Arrays of Inexpensive (or Independent) Disks) or the like. The logical storage area is a logical device (Logical DEVice, hereinafter called "LDEV" (unit logical storage area)) which is configured with a RAID group (parity group), for example. In addition, the storage apparatus 10 provides the host 2 with a logical storage area (Logical Unit or Logical Volume, hereinafter called "LU") (logical volume) configured with a LDEV. The storage apparatus 10 manages correspondence (relationship) between the LU and the LDEV, and identifies a LDEV corresponding to a LU or a LU corresponding to a LDEV, on the basis of the correspondence. An LDEV for data I/O processing is allocated to each of MPs mounted on the MP board 104, which will be described later.

Figure 5:
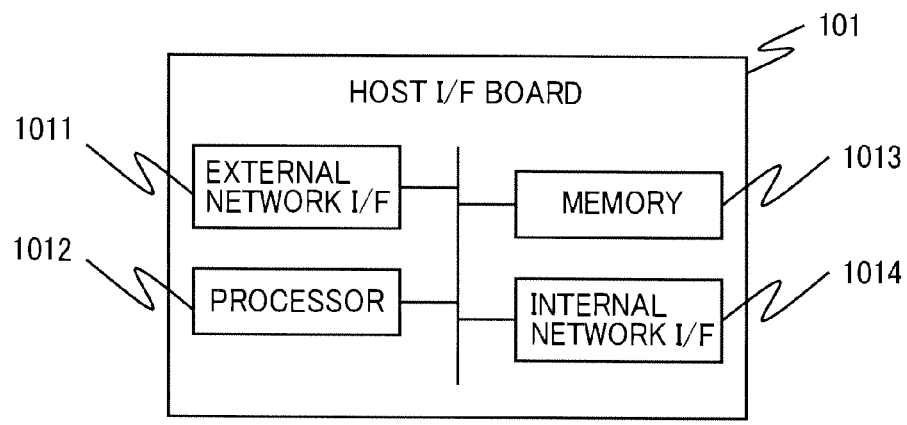
FIG. 5 is a hardware configuration diagram of a host interface board 101 provided in the controller device 100.

FIG. 5 shows a hardware configuration of the host I/F board 101. As shown in FIG. 5, the host I/F board 101 includes an external network interface (hereinafter, "external network I/F") 1011 having a port (network port) for communicating with the host 2, a processor 1012 (including a frame processing chip and a frame transfer chip to be described later), a memory 1013 and an internal network interface (hereinafter, "internal network I/F") 1014 having a port (network port) for communicating with the MP boards 104.

The external network I/F 1011 is configured with a NIC (Network Interface Card), a HBA (Host Bus Adaptor) or the like. The processor 1012 is configured with a CPU (Central Processing Unit), a MPU (Micro Processing Unit) or the like. The memory 1013 is a RAM (RandomAccess Memory) or a ROM (Read Only Memory). The memory 1013 stores a microprogram therein. The processor 1012 implements various types of functions provided by the host I/F board 101 by loading the microprogram from the memory 1013 and then executing the microprogram. The internal network I/F 1014 communicates with the MP boards 104, the drive control boards 105 and the memory boards 103 through the internal networks 106 and the switch boards 102.

Figure 6:
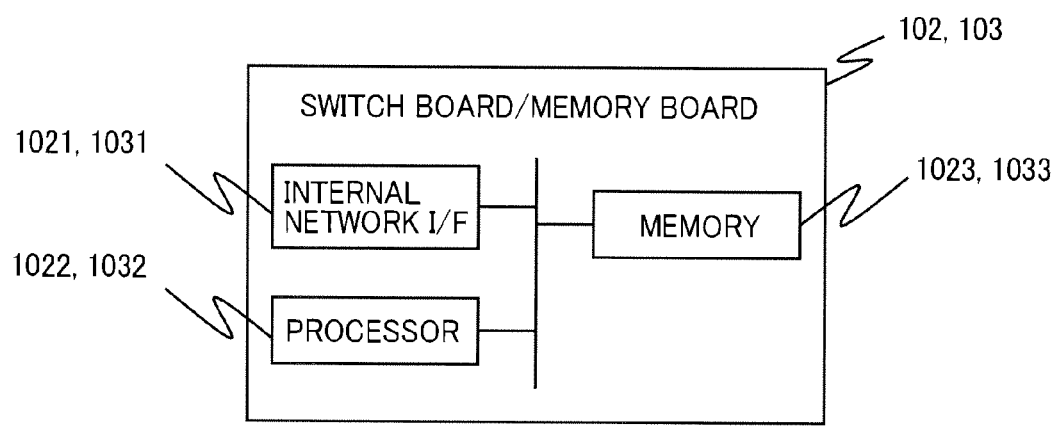
FIG. 6 is a hardware configuration diagram of a switch board 102 and a memory board 103 provided in the controller device 100.

FIG. 6 shows a hardware configuration of the switchboard 102 and the memory board 103. As shown in FIG. 6, the switch board 102 and the memory board 103 include processors 1022, 1032, memories 1023, 1033 and internal network I/F 1021, 1031, respectively.

The processors 1022, 1032 are configured with a CPU, a MPU or the like. The memory 1023, 1033 is a RAM or a ROM. The memory 1023 of the switch board 102 stores therein a microprogram which is loaded and executed by the processor 1022 for implementing various types of switching functions. The memory 1033 of the memory board 103 is used as a cache memory and a shared memory. The internal network I/F 1021, 1031 communicates with the MP boards 104 and the drive control boards 105 through the internal networks 106 and the switch boards 102. Note that, the memory board 103 may not be necessarily equipped with the processor 1032, in particular.

Figure 7:
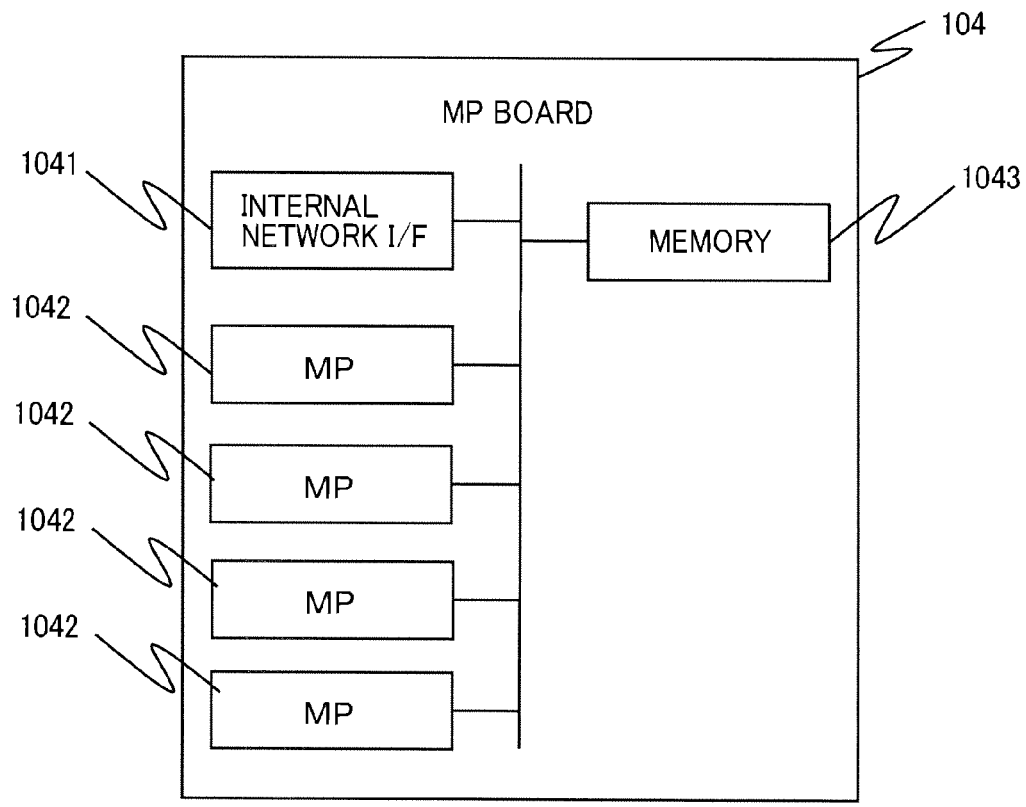
FIG. 7 is a hardware configuration diagram of an MP board 104 provided in the controller device 100.

FIG. 7 shows a hardware configuration of the MP board 104. The MP board 104 includes an internal network I/F 1041, MPs 1042, and a (fast access) memory 1043 (local memory) accessible at a higher speed from the MPs 1042 than the memory 1033 of the memory board 103. The memory 1043 stores a microprogram therein. The MPs 1042 implement various types of functions provided by the MP board 104 by loading the microprogram from the memory 1043 and then executing the microprogram.

The internal network I/F 1041 communicates with the host I/F boards 101, the drive control boards 105 and the memory boards 103 through the internal networks 106 and the switch boards 102. The MP 1042 is configured with a CPU, a MPU, a DMA (Direct Memory Access) or the like. The memory 1043 is a RAM or a ROM. The MP 1042 is capable of accessing any of the shared memories formed by the memory 1043 and the memories 1033 of the memory boards 103. In the example shown in FIG. 7, four MPs 1042 are mounted on a single MP board 104. However, the number of the mounted MPs 1042 can be determined appropriately according to the design requirements or the like.

Figure 8:
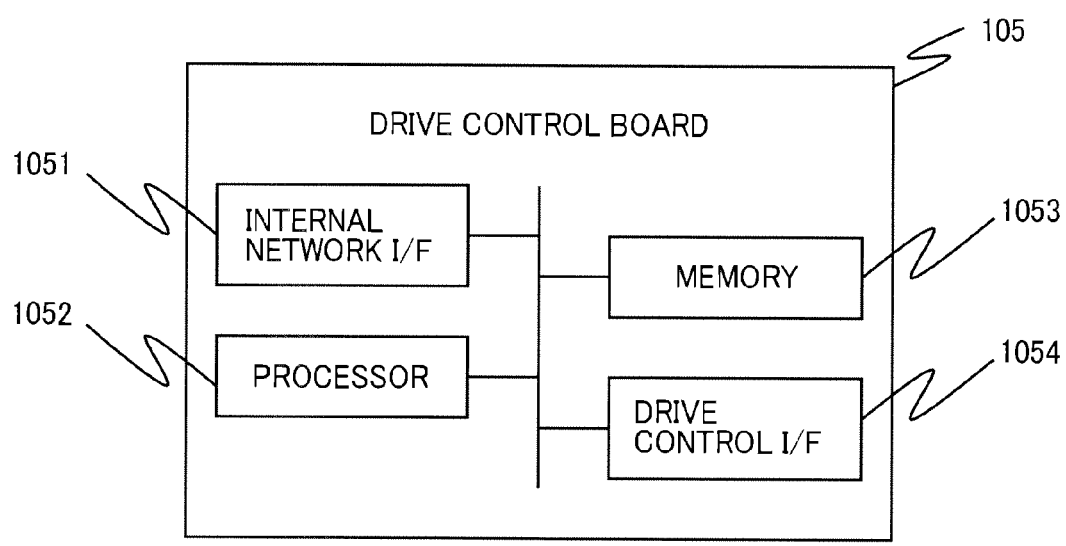
FIG. 8 is a hardware configuration diagram of a drive control board 105 provided in the controller device 100.

FIG. 8 shows a hardware configuration of the drive control board 105. The drive control board 105 includes an internal network I/F 1051, a processor 1052, a memory 1053 and a drive control interface (hereinafter, "drive control I/F") 1054. The memory 1053 stores a microprogram therein. The processor 1052 implements various types of functions provided by the drive control board 105 by loading the microprogram form the memory 1053 and then executing the microprogram.

The internal network I/F 1051 communicates with the host I/F boards 101, the MP boards 104 and the cache memories and the shared memories formed by the memories 1033 of the memory boards 103, through the internal networks 106 and the switch boards 102. The processor 1052 is configured with a CPU, a MPU or the like. The memory 1053 is a RAM or ROM, for example. The drive control I/F 1054 communicates with the drive board 201 of the drive unit device 200.

Figure 9:
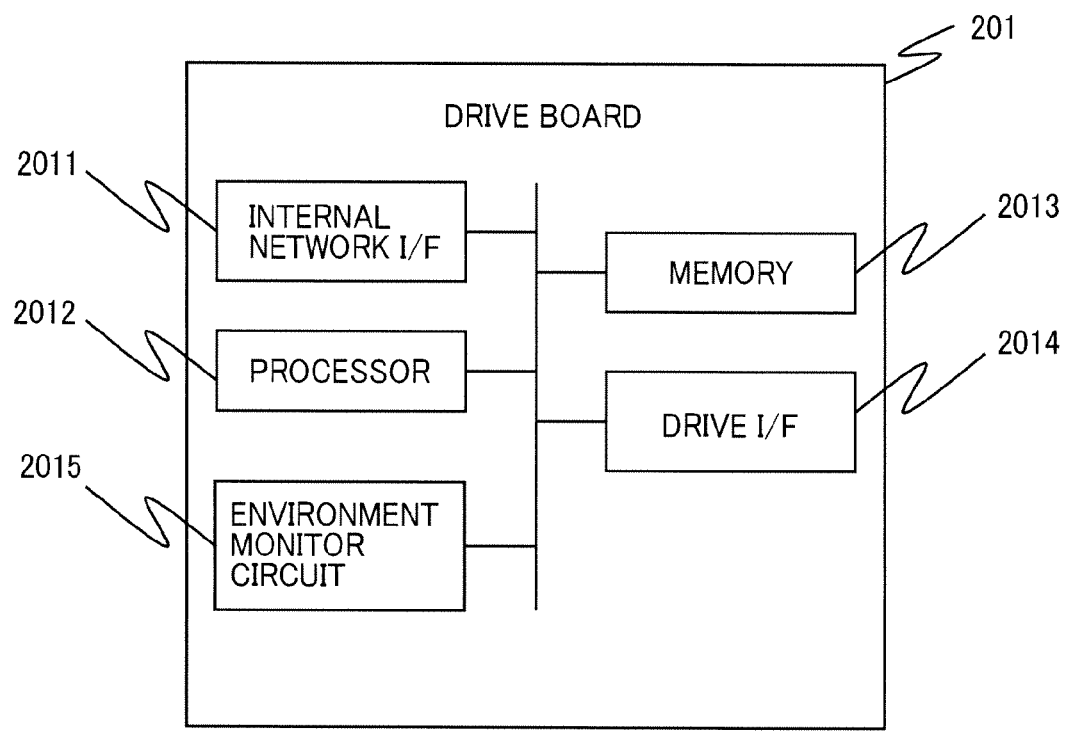
FIG. 9 is a hardware configuration diagram of a drive board 201 provided in the drive unit device 200.

FIG. 9 shows a hardware configuration of the drive board 201. The drive board 201 includes an internal network I/F 2011, a processor 2012, a memory 2013, a drive interface (hereinafter, "drive I/F") 2014 and an environment monitor circuit 2015. The memory 2013 stores a microprogram therein. The processor 2012 implements various types of functions provided by the drive board 201 by loading the microprogram form the memory 2013 and then executing the microprogram.

The internal network I/F 2011 communicates with the drive control board 105 of the controller device 100 through an inter-chassis wiring. The processor 2012 is configured with a CPU, an MPU or the like. The memory 2013 is a RAM or ROM, for example. The drive I/F 2014 is a block that communicates with the storage drives 202, and can be configured with a so-called one-chip microcomputer in which a CPU and memory are packaged as a single unit, for example.

The environment monitor circuit 2015 monitors the operating status of the storage apparatus 10 in real time, and acquires at any time measurement values sent from sensors installed in various positions in the storage apparatus 10. The sensors include, for example, a temperature sensor, a voltage sensor, a current sensor, a frost sensor and a revolving speed sensor that measures the number of revolutions of the fan 231. The environment monitor circuit 2015 is configured with a one-chip microcomputer, for example, as similar to the drive I/F 2014.

Returning to FIG. 4, a maintenance device (SerVice Processor, hereinafter referred to as an "SVP") 300 performs control and status monitoring on the respective components of the storage apparatus 10. The SVP 300 is a personal computer, an office computer, or the like. The SVP 300 communicates with the components of the storage apparatus 10 such as the host I/F boards 101, the MP boards 104, the drive control boards 105, the memory boards 103, the switch boards 102, and the like via the communication means such as the internal network 106 and LAN 107 as needed, acquires the operational information and the like from the respective components, and provides the same to the management device 4. Furthermore, the SVP 300, performs the setting, control, and maintenance for the respective components (including introducing and updating of software) in accordance with the control information and the operational information transmitted from the management device 4.

The management device 4 is a computer coupled to the SVP 300 via LAN and others. The management device 4 includes a user interface using GUI (Graphical User Interface), CLI (Command Line Interface), or the like for the control on and monitoring of the storage apparatus 10.

Figure 10:
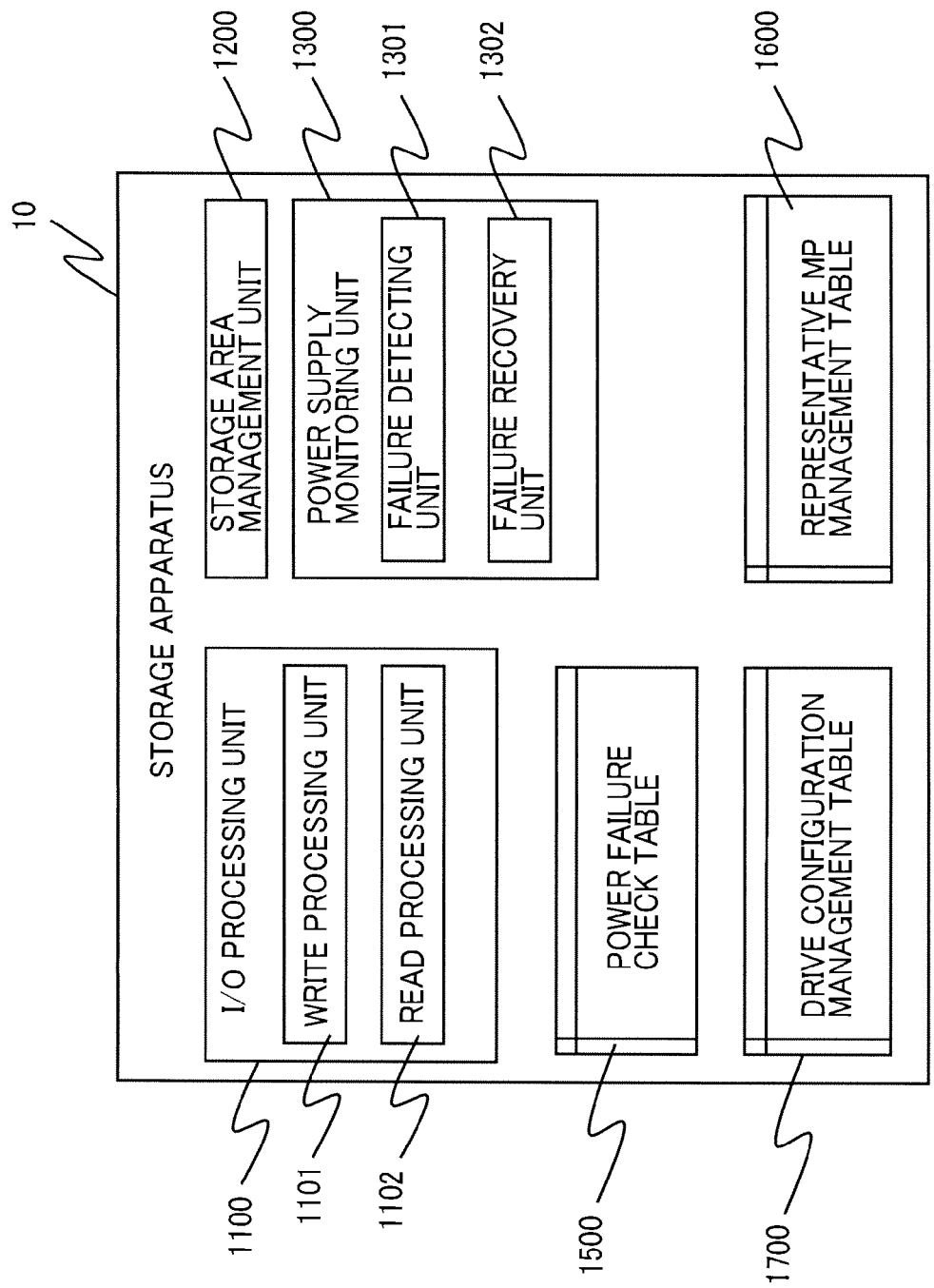
FIG. 10 is a software configuration diagram of the storage apparatus 10.

Next, a software configuration of the storage apparatus 10 will be described. FIG. 10 shows an exemplary software configuration of the storage apparatus 10. As shown in FIG. 10, the storage apparatus 10 includes an I/O processing unit 1100, a storage area management unit 1200, and a power supply monitoring unit 1300.

The I/O processing unit 1100 includes a data write processing unit 1101 that performs processing for writing data to the drive unit device 200, and a data read processing unit 1102 that performs processing for reading data from the drive unit device 200.

The storage area management unit 1200 is provided to allow respective MPs 1042 mounted on the MP boards 104 of the controller 100 to perform data input/output processing on their corresponding LDEVs, and the respective MPs 1042 perform the data input/output processing related to the corresponding LDEVs in accordance with the instructions from the storage area management unit 1200.

The power supply monitoring unit 1300 is a block that has a function to monitor the state of the drive unit power supply of the drive unit device 200 based on the process status of the data I/O command to the afore-mentioned storage drive 202 and is provided with a characteristic function of the present embodiment. The power supply monitoring unit 1300 includes a failure detection unit 1301 and a failure recovery unit 1302. The failure detection unit 1301 is a function block for monitoring the processing status of the data I/O command issued by the MP in the drive I/F 2014 in the drive board 201 of the drive unit 200 and performing various types of processing described later in case of an occurrence of a power failure. The failure recovery unit 1302 is a function block for determining whether or not the drive unit 200 in which the power failure was detected has recovered and performing the failure recovery process in a case of recovery.

Note that the functions of the I/O processing unit 1100, the storage area management unit 1200, and the power supply monitoring unit 1300 are implemented in such a way that the MPs 1042 mounted on the MP boards 104 of the storage apparatus 10 reads and performs the microprograms stored in the memories 1043. A power failure check table 1500, a representative MP management table 1600, and a drive configuration management table 1700 will be described later.

Data I/O Processing of Storage Apparatus 10

Next, the data I/O processing on the storage drives 202 performed by the storage apparatus 10 having the above-mentioned configuration will be described. This data I/O processing is a general processing performed by the storage apparatus 10.

Figure 11:
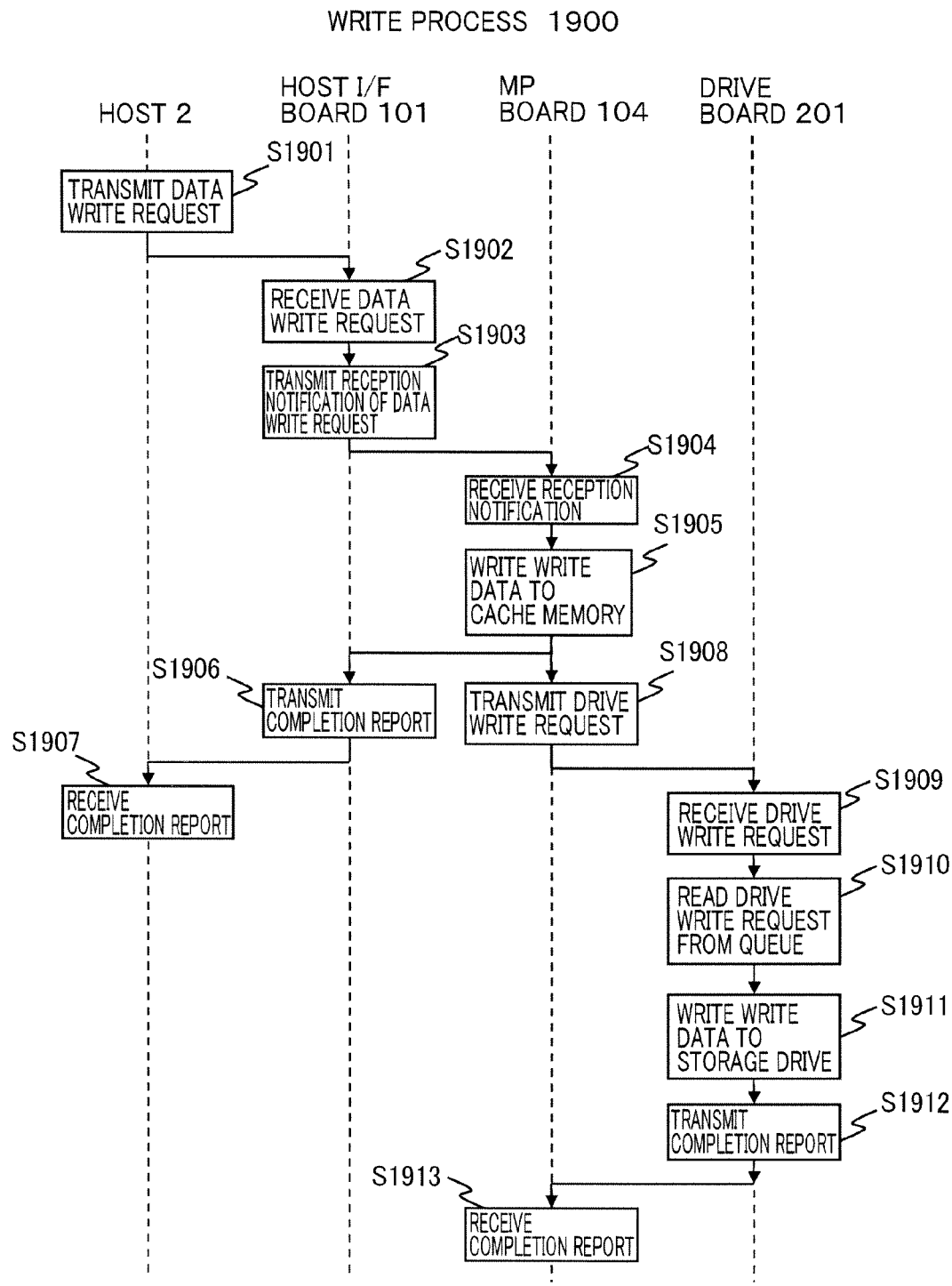
FIG. 11 is a diagram showing an exemplary data write process flow in the storage apparatus 10.

FIG. 11 is a flowchart for explaining a process (hereinafter, "data write process 1900") that the data write processing unit 1101 of the I/O processing unit 1100 executes when the storage apparatus 10 receives a frame including a data write request from the host 2. Hereinafter, the data write process 1900 will be described with reference to FIG. 11. In the following explanation, the letter "S" attached in front of a reference number denotes step.

A frame sent from the host 2 is received by the host I/F board 101 of the storage apparatus 10 (S1901, S1902). Upon receipt of the frame, the host I/F board 101 notifies the MP board 104 of the reception (S1903).

Upon receipt of the notification from the host I/F board 101 (S1904), the MP board 104 generates a drive write request based on the data write request in the frame, and stores the generated drive write request in the memory 1033 (cache memory) of the memory board 103. Then, the MP board 104 transmits the generated drive write request to the drive board 201 (S1908). The host I/F board 101 transmits a completion report to the host 2 (S1906), and the host 2 receives the completion report (S1907).

The drive board 201 receives the drive write request and then registers the request in a write processing waiting queue (S1909). The drive board 201 reads the drive write request from the write processing waiting queue as needed (S1910). The drive board 201 reads write data specified by the read drive write request from the memory 1033, and writes the read write data into the storage drive 202 (S1911).

After that, the drive board 201 sends the MP board 104 a report (completion report) indicating a completion of writing of the write data for the drive write request (S1912), and the MP board 104 receives the sent completion report (S1913).

Figure 12:
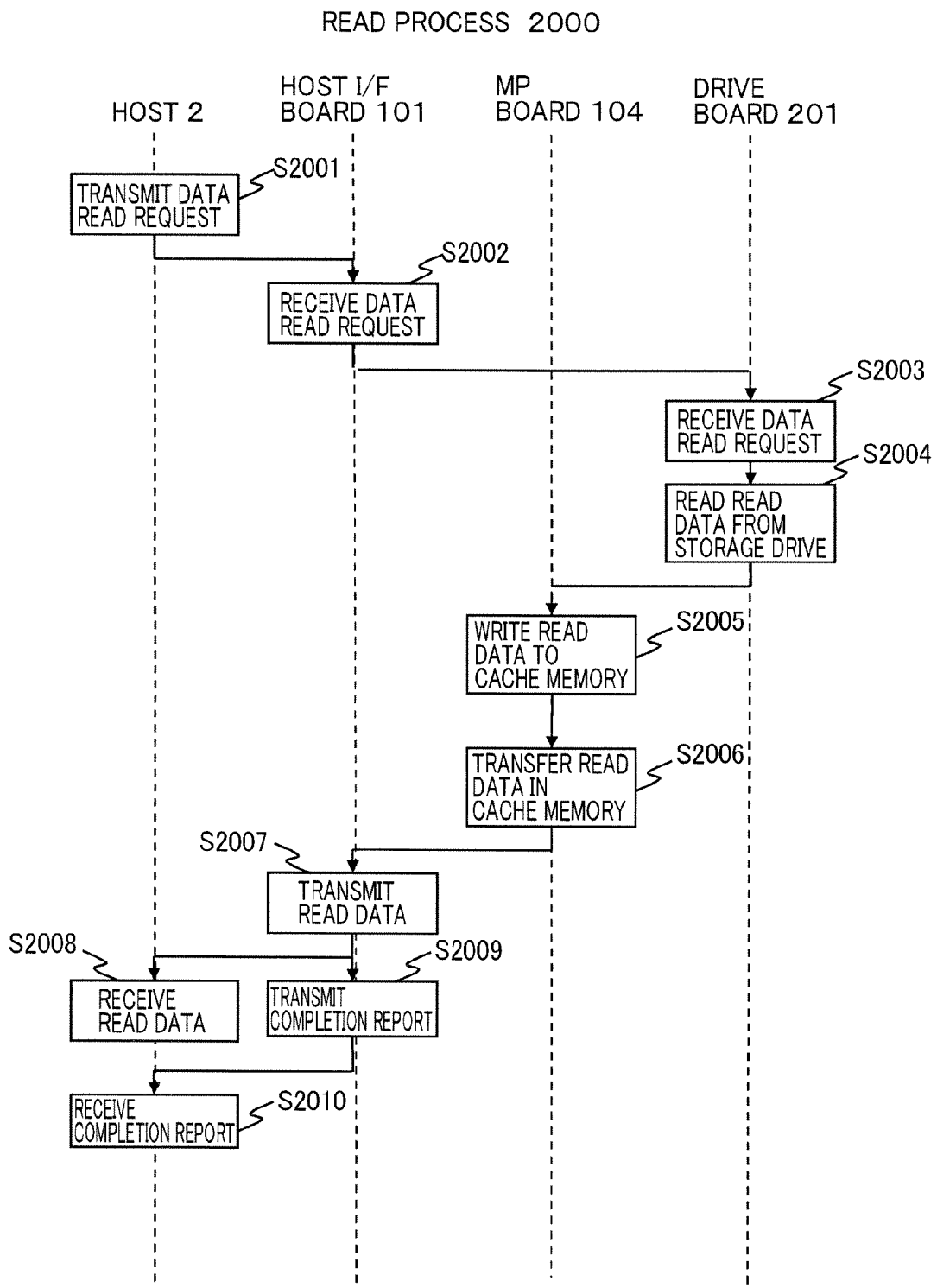
FIG. 12 is a diagram showing an exemplary data read process flow in the storage apparatus 10.

FIG. 12 is a flowchart for explaining an I/O process (hereinafter, "data read process 2000") that the data read processing unit 1102 of the I/O processing unit 1100 executes when the storage apparatus 10 receives a frame including a data read request from the host 2. Hereinafter, the data read processing 2000 will be described with reference to FIG. 12.

A frame sent from the host 2 is received by the host I/F board 101 of the storage apparatus 10 (S2001, S2002). Upon receipt of the frame from the host 2, the host I/F board 101 notifies the drive board 201 of the reception (S2003).

Upon receipt of the notification from the host I/F board 101, the drive board 201 reads from the storage drive 202 the data specified by the data read request included in the frame (for example, data specified with a LBA (Logical Block Address)) (S2004). When the read data is present in the memory 1033 (cache memory) of the memory board 103 (i.e., in case of a cache hit), the read processing (S2004) from the storage drive 202 is omitted. The MP board 104 writes the data read by the drive board 201 into the cache memory (S2005). The MP board 104 transfers the data written into the cache memory to the host I/F board 101 as needed (S2006).

The host I/F board 101 sequentially sends the host 2 the read data which is sent from the MP board 104 (S2007, S2008). Upon completion of the sending of the read data, the host I/F board 101 sends a completion report to the host 2 (S2009), and the host 2 receives the sent completion report (S2010).

Power Failure Detection System

Figure 13:
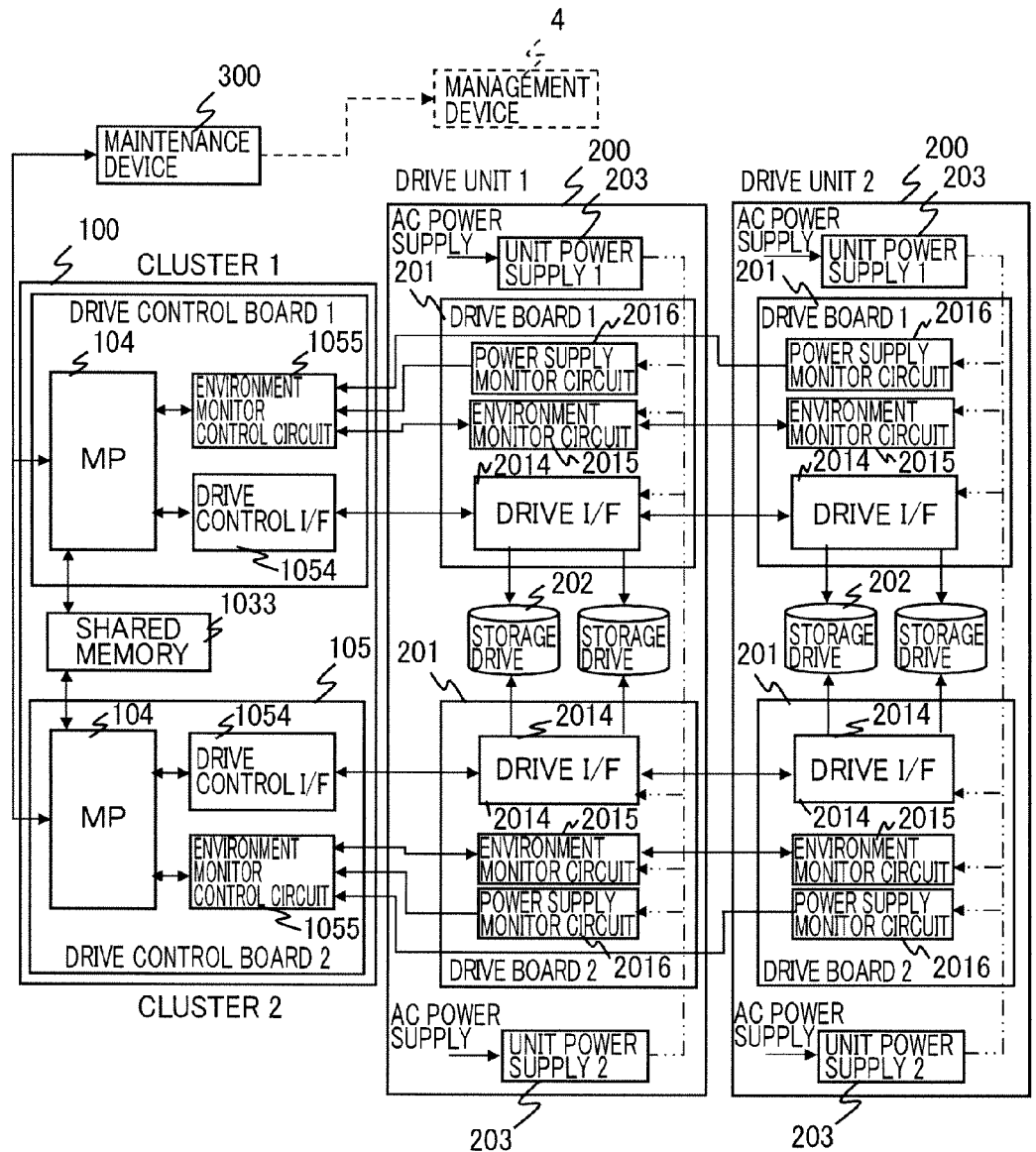
FIG. 13 is a schematic diagram showing an exemplary existing power failure detection system.

Next, a power failure detection system implemented in the storage apparatus 10 of the above-mentioned configuration will described in comparison with typical existing examples. FIG. 13 shows an example of an existing power failure detection system.

In the example of FIG. 13, a basic configuration as a storage apparatus 10 is similar to that of the present invention illustrated in FIG. 4 except that MP 104s for two systems in charge of data I/O to and from the storage drives 202 are each provided on respective one of the drive control boards 105. These MPs 104 are provided in separate systems in this manner to ensure the redundancy of the power supply system and, here, respective systems are referred to as cluster 1 and cluster 2 (also abbreviated as "C1" and "C2" as needed). Furthermore, the components belonging to the cluster 1 and the cluster 2 are distinguished from each other by being referring to as, for example, MP1 and MP2, the drive unit 1 and the drive unit 2, and the like. Each of the MPs 104 can access the drive control board 105 belonging to the same cluster as the MP 104 itself, but cannot access the drive control boards 105 belonging to the other cluster. In this point, the existing configuration in FIG. 13 is different from the configuration of the present embodiment.

The configuration of FIG. 13 also shows the storage apparatus 10 in which two drive units 200 are coupled to a single controller 100. In practice, there are other possible configurations in which two or more controllers 100 and one or three or more drive units 200 are provided in a single apparatus chassis.

The data I/O command process for the storage drives 202 and the power supply monitoring and power failure detection process of the drive units 200 by the MPs 104 are performed on a cluster-by-cluster basis. Both the MP1 and the MP2 can access the shared memory (for example, the memory 1033) of the controller 100, and can write and read data to be shared for use by the MP1 and the MP2.

Each drive unit 200 is provided with drive unit power supplies respectively for two systems of clusters (hereinafter referred to as "unit power supplies") 203, which are respectively coupled to AC power supplies of separate systems via switches such as breakers. The unit power supplies 203, for example, include AC/DC switching power supply devices having a plurality of DC voltage outputs. The above-mentioned environment monitoring circuits 2015 and the power supply monitoring circuits 2016 are respectively provide on the drive boards 201 of the respective drive units 200. The unit power supplies 203 supply operational power supply to the drive boards 201 and input power supply information signals to the power supply monitoring circuits 2016. The power supply information signals are the signals for reporting loss and abnormal reduction of output voltage and power failure caused by various types of abnormality in the unit power supplies 203.

Upon receipt of the power supply information signal, the power supply monitoring circuit 2016 transmits the power supply information signal to the MP 104 via an environment monitoring control circuit 1055. As described above, a dedicated communication line is provided between the environment monitoring control circuit 1055, the environment monitoring circuit 2015, and the power supply monitoring circuit 2016, and the various types of measurement value data including the power supply information signal is transmitted and received by an appropriate communication protocol. Since the power supply monitoring circuits 2016 are provided in respective clusters in respective drive units 200, the number of signal lines from the power supply monitoring circuits 2016 installed between the drive units 200 and the controller 100 also increases with an increase in the number of drive units 200 coupled to the controller 100.

That is, in the above-mentioned existing example, it is necessary to provide an interface circuit on the MP board 104 for receiving power supply information signals from the environment monitoring control circuit 1055 and a power supply monitoring circuit 2016 on the drive board 201 of each drive unit 200, and a dedicated power supply information signal line is required between the MP board 104 and the drive unit 200. Therefore, it is difficult to meet the market demands for downsizing, power saving, and cost reduction of the storage apparatus 10. Furthermore, since the failure rate increases with an increase in the number of components of the power supply monitoring circuit 2016 and the peripheral circuit, the reliability as the storage apparatus 10 tends to decrease. Furthermore, since the power supply monitoring circuit 2016 is provided in the drive unit 200, a dedicated signal line or the like to the controller 100 is required and thus there was a problem that an inexpensive general-purpose disk drive device cannot be adopted as a drive unit 200.

Figure 14:
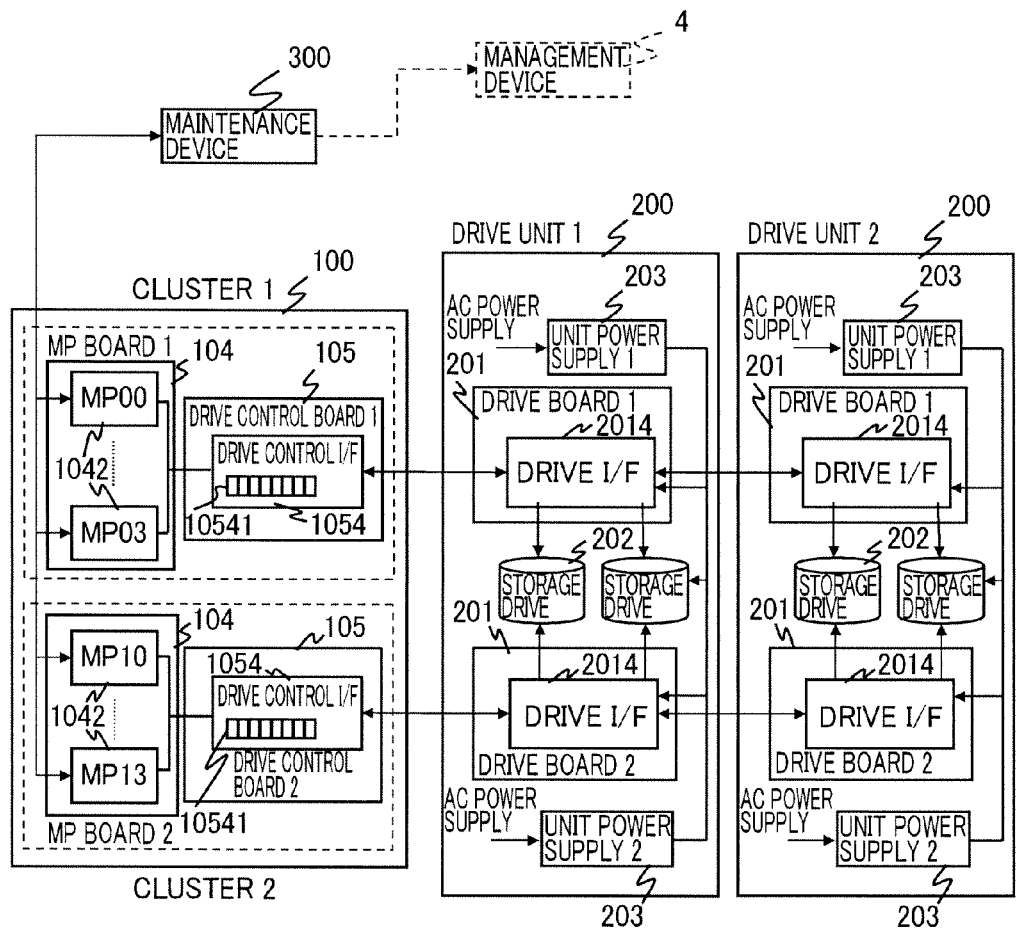
FIG. 14 is a schematic diagram showing an exemplary existing power failure detection system.

Next, another existing example will be described. FIG. 14 shows an example of a power failure detection system related to another existing example. In contrast to the above-mentioned typical existing example, the configuration example of the power failure detection system shown in FIG. 14 includes the MPs 1042 in charge of data I/O to and from the storage drives 202 provided on the MP boards 104 independently, unlike the configuration example of FIG. 13, and, in the example of FIG. 14, four MPs 1042 respectively are provided on an MP board 104 provided for each power supply system of the storage apparatus 10. These MPs 1042 can communicate with any other MPs 1042 via the switch board 102 shown in FIG. 4.

Referring to the configuration example of FIG. 14, the drive control boards 105 are not provided with circuits corresponding to the environment monitoring control circuits 1055 in FIG. 13, and the power supply information signals related to the unit power supplies 203 are input to the drive I/Fs 2014 on the drive boards 201 of the drive units 200, and are received by utilizing the communication interface (Fibre Channel, SAS, SATA, and others) of data I/O of the storage drives 202 performed between the drive control I/Fs 1054 and the drive I/Fs 2014.

The drive control I/Fs 1054 on the drive control boards 105 in the controller 100 is provided with data queues 10541 for sequentially storing data I/O commands from the MPs 1042. These data queues 10541 are, in a hardware aspect, stored in the shared memory set in the memories 1033 of the memory boards 103 and can be accessed by all the MPs 1042 in the controller 100. The data queues 10541, furthermore, stores commands related to the recovery processing from power failures and the like by the representative MP 1042 which performs the power supply monitoring and power failure detection processes.

According to the above-mentioned configuration, since it becomes unnecessary to provide power supply monitoring circuits 2016 and associated circuits on the MP boards 104 and the drive units 200, it can be said that the relevant problems have been solved. However, since the data queues 10541 are also used for the power failure detection processing, in a case where a power failure detection command is simply set for the data queues 10541, if a normal data I/O command issued by the MP 1042 to the storage drives 202 is already set in the data queue 10541, since the power failure detection command for the drive I/F 2014 will be processed after the preceding normal command have been processed, the determination time required for detecting a power failure will increase and thus there will be a delay in the retransmission of the failure command in case where the power failure has been detected. Therefore, the data I/O processing performance of the storage apparatus 10 may decrease in case of a power failure. Furthermore, in a case where the processing of the command stored in the data queue 10541 is delayed due to the delay of the response of the storage drives 202 of the drive unit 200 or other reasons, since the response delay time exceeds the command processing waiting time, there will be a problem that a power failure is erroneously detected despite the fact that there is no power failure in the drive unit 200 and might lead to a false blockage or the like of the drive unit 200 and possibly a system outage.

Description of Power Failure Detection System of the Present Embodiment

Figure 15:
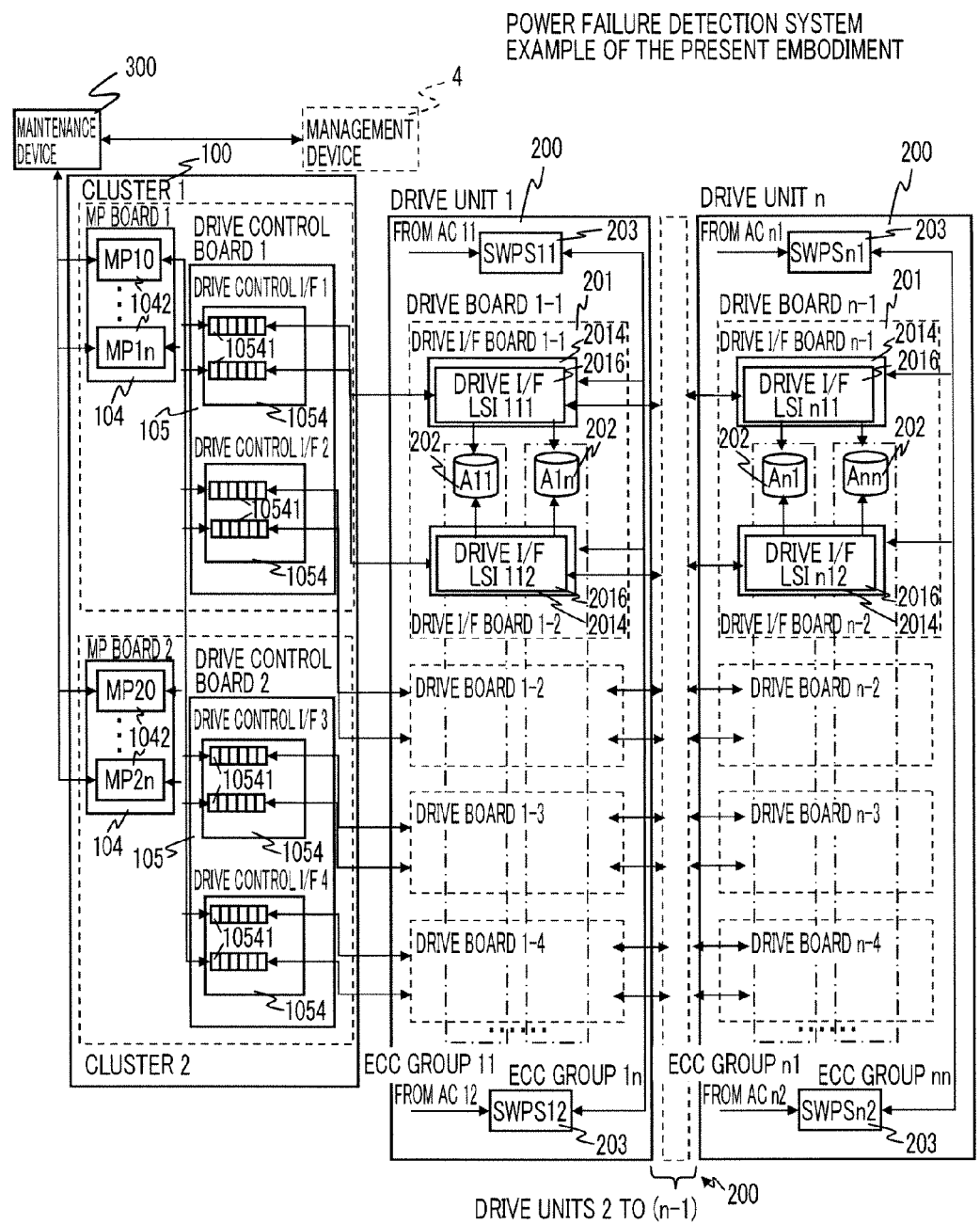
FIG. 15 is a schematic diagram showing an exemplary power failure detection system of the present embodiment.

Next, an exemplary system configured to perform power failure detection in the above-mentioned storage apparatus 10 will be described. FIG. 15 shows an example of a power failure detection system of the present embodiment. The power failure detection system of the present embodiment includes data queues 10541 configured to temporarily store commands issued by the MPs 1042, and has a configuration similar to the exemplary configuration shown as the second existing example. Hereinafter, what is different from the existing example is mainly described.

The controller 100 is includes two separate clusters, i.e., a cluster 1 and a cluster 2, to provide redundancy in the power supply system and, each cluster is provided with an MP board 104 including a plurality of MPs 1042. Furthermore, the controller 100 is provided with a drive control board 105 for each of the clusters and drive control I/Fs 1054 on each of the drive control boards 105 is provided with two data queues 10541. With the functions of the switch board 102 which is not shown in FIG. 15, each MP 1042 can access any one of the drive control I/Fs 1054 of any one of the clusters. Therefore, data I/O commands and the like issued by each of the MPs 1042 to the storage drives 202 and the like in the drive unit 200 can be stored in any of the data queues 10541. Furthermore, as will be described later, each of the data queues 10541 is capable of storing therein a dedicated inquiry command for checking whether a power failure has occurred or not in the drive unit 200.

In the exemplary configuration of FIG. 15, the plurality of drive units 200 are connected in series with the controller 100. Each drive unit 200 is supplied with power from a redundant system including two unit power supplies 203. Therefore, if a power failure occurs in any of the drive units 200, the drive unit 200 in which the power failure has occurred and the subsequent drive units 200 connected in series to the same, that is, the downstream drive units 200, become inaccessible from the MPs 1042.

Each drive unit 200 shown by way of example in FIG. 15 is provided with four drive boards 201. Each drive board 201 is provided with two drive I/F LSIs 2016 and has a function of transmitting commands transferred from the data queues 10541 in the controller 100 to the destination storage drives 202 and a function of transmitting data and the like read out from the storage drives 202 to the drive control I/Fs 1054 in the controller 100. Each of the drive boards 201 in the drive units 200 is provided with a plurality of storage drives 202. Furthermore, the exemplary configuration example of FIG. 15 includes n-drive units 200, i.e., drive unit 1 to drive unit n, but any appropriate number, which is two or more, of drive units 200 may be provided in accordance with the storage capacity required for the storage apparatus 10.

The storage drives 202 provided in each of the drive units 200 forms an ECC group the plurality of storage drives 202 for the error correction process in the data I/O process. The ECC group may be, as is well known, a combination such as "3D+P" and "7D+P", where "D" stands for a storage drive 202 configured to store data and a "P" stands for a storage drive 202 configured to store a data parity.

Hereinafter, the term "path" refers to a data path which is a route through which data transfer is performed between the respective data queues 10541 in the drive control I/Fs 1054 in the controller 100 and the respective drive I/F boards 2014 in the drive units 200, that is, the respective drive I/F LSIs 2016. In the exemplary configuration of FIG. 15, eight paths, i.e., path A to path H, are provided between the drive control boards 105 in the controller 100 and the drive I/F boards 2014 in the drive units 200.

Power Failure Detection Method of the Present Embodiment

Figure 16:
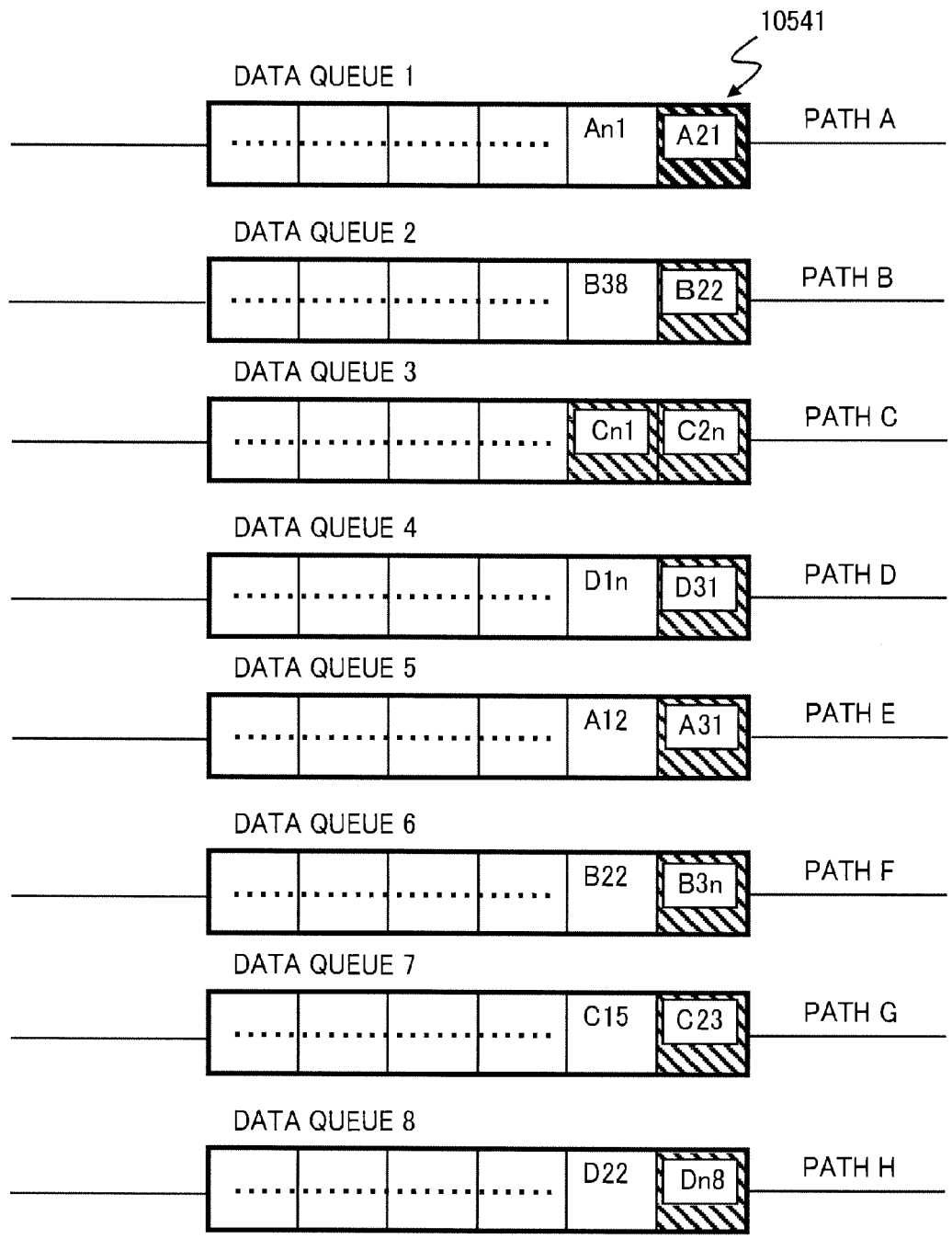
FIG. 16 is a schematic diagram showing an exemplary configuration of drive queues provided in the drive control board 105.

Next, an overview of a power failure detection method in the exemplary power failure detection system of the present embodiment will be described. FIG. 16 shows a schematic diagram of data queues 10541 each storing data I/O commands issued by the MPs 1042. In FIG. 16, for the sake of simplicity, destination drive names for data stored in the first two blocks for each data queue 10541 are shown. For example, in FIG. 16, it is shown that Data Queue 1 stores data to be transmitted to Path A which is a data transfer path to a drive I/F board 2-1 of a drive unit 2 and that destinations of the data are, in order from the front, a "storage drive A21 coupled to the drive I/F board 2-1 of the drive unit 2" and a "storage drive An1 coupled to a drive I/F board n-1 of a drive unit n." Further, it is shown that commands for the storage drives 202 provided on the drive unit 2 and subsequent drive units are stored, such as "storage drive B22 of the drive unit 2" for the data queue 2 and the like. In the present embodiment, the MPs 1042 which have issued each command stored in the data queue 10541 respectively measures the time elapsed since an issuance of the command, and detects an occurrence of a specified data transfer failure based on a timeout after the issuance of the command, for example, in the SAS interface, an "IT-Nexus-Loss" timeout. A condition for detection may be, for example, "time elapsed since issuance of command>data transfer failure detection time+output reduction time of unit power supply 203 in case of power outage".

Figure 17:
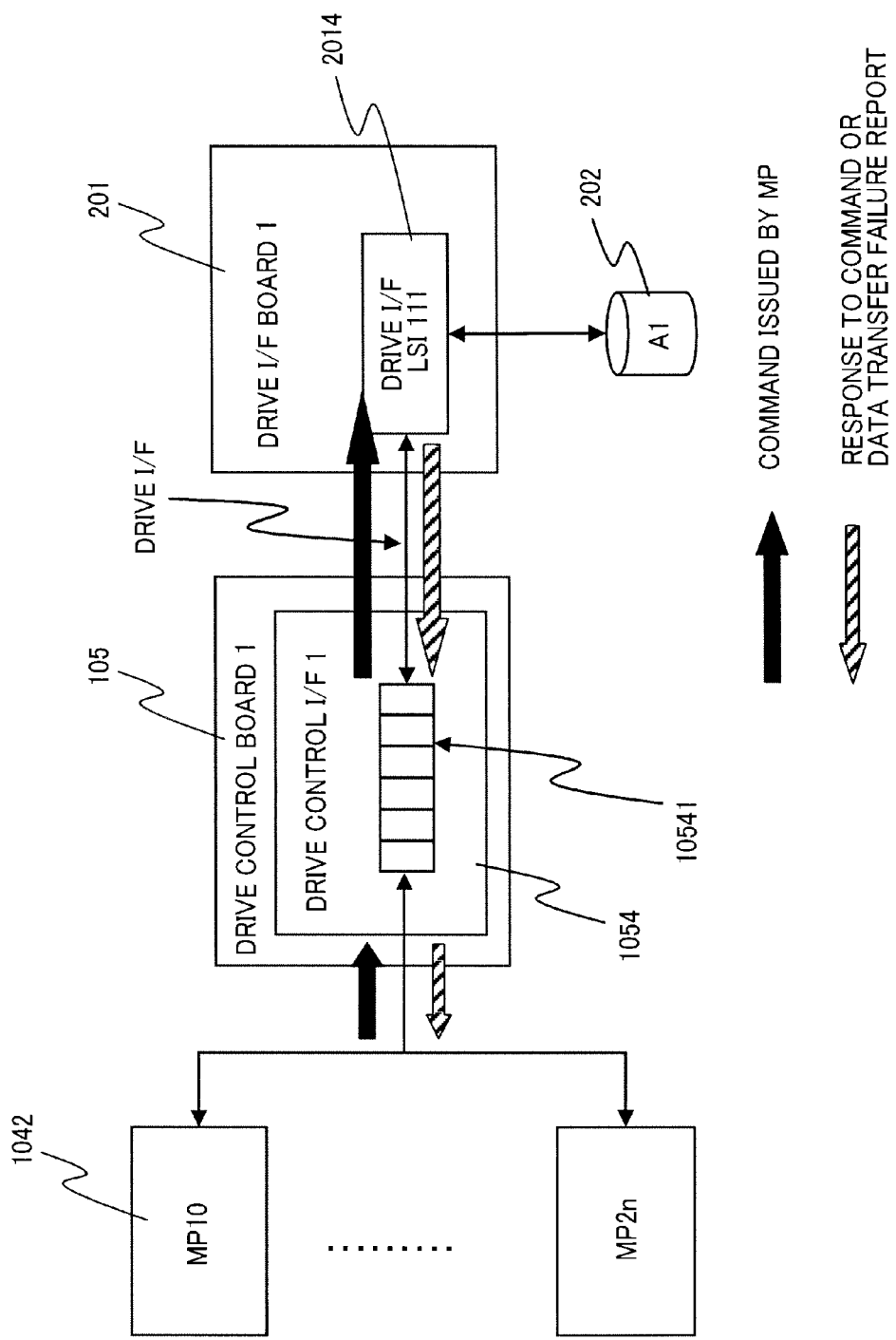
FIG. 17 is a schematic diagram showing a status of data transfer failure detection in the drive unit 200.

FIG. 17 shows a schematic diagram of an overview of the above-mentioned power failure detection method. In FIG. 17, the flow of the data (command) is shown by focusing on one of the data queues 10541 shown in FIG. 16. In a case where the power supply of the drive unit 200 is operating normally, the command issued by one of the MPs 1042 is once stored in the data queue 10541 in the drive control I/F 1054 and then transferred to the drive I/F LSI 2014 controlling the storage drive 202 which is the destination of the command, and processes such as the data I/O process which corresponds to the contents of the command is performed. However, in a case where there is a power failure of the drive unit 200, since no response for the command is returned even after an elapse of the timeout time, the MP 1042 which has issued the relevant command determines that a power failure might have occurred in the destination drive unit 200. In a case where a power failure has occurred in the drive unit 200, since no normal response for the command can be acquired for any of the paths shown in FIG. 16, in the present embodiment, determination of whether a power failure has occurred in the drive unit 200 and, if this is true, in which drive unit 200, is made by summing up the results of performing the commands issued by the respective MPs 1042.

Figure 18:
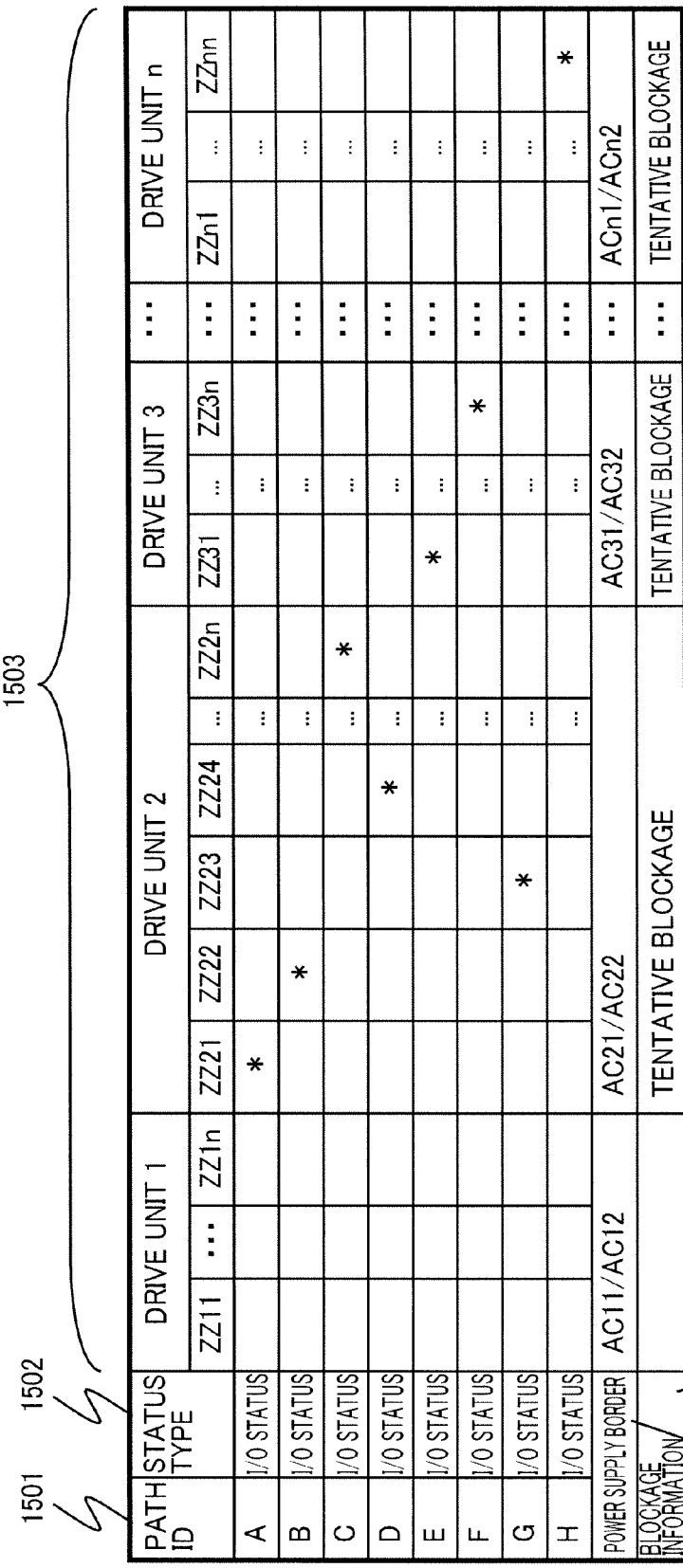
FIG. 18 is a diagram showing an exemplary configuration of a power failure check table 1500.

Next, a power failure check table 1500 (failure existence/non-existence recording part) will be described which is a table used for summing up the command processing results by the above-mentioned respective MPs 1042. FIG. 18 shows an example of the configuration of the power failure check table 1500. As described above, the power failure check table 1500 is a table for keeping a record for each path in a case where the processing result is determined to be abnormal as for the respective commands issued by the respective MPs 1042 and, in a case where the record of the result of summation of the power failure check table 1500 shows that the command process is determined to be abnormal for all the paths, a power failure is determined to have occurred in one of the drive units 200.

In the exemplary power failure check table 1500 shown in FIG. 18, respective items, i.e., a path ID 1501, a status type 1502, a path unit abnormality existence/non-existence record 1503, a power supply border 1510, and blockage information 1520 are recorded by the MPs 1042. The power failure check table 1500 is set and maintained, for example, in a shared memory in the memory boards 103.

The path ID 1501 indicates path IDs which are identification symbols for identifying the paths through which the MPs 1042 have performed the command process such as data I/O and, in the example of FIG. 18 shows the paths A to H which are shown in FIG. 16.

The status type 1502 is an item indicating the type of command process abnormality recorded in the power failure check table 1500 and, in the example of FIG. 18, "I/O status" indicating that the record is related to an abnormality of the data I/O command process (the above-mentioned command timeout, etc.). The item of the path unit abnormality existence/non-existence record 1503 is a field used for recording whether any command processing abnormality exists in each path identified by the path ID 1501 and, for the path where the command processing abnormality exists, a symbol "*" is recorded by the MP 1042 which was going to perform data transfer through the relevant path. Note that an item of the path unit abnormality existence/non-existence record 1503 includes an identification symbol for identifying a drive unit 200 (for example, a drive unit 1) and an identification symbol for identifying a storage drive 202 provided in each drive unit 200. In FIG. 18, the storage drive identification symbols are denoted as, for example, "ZZ11" to "ZZnn" and this is for simply describing the entire configuration of the power failure check table 1500 and, in practice, either one of "A to D" is indicated in the place of the symbol ZZ depending on where each drive unit 200 belongs to.

The item of the power supply border 1510 indicates identification information of the unit power supply 203 provided in each drive unit 200. In the item of the blockage information 1520, the phrase "tentative blockage" is recorded in order that the respective MPs 1042 cannot issue commands for the drive unit 200 in which the power failure is determined to have occurred and the drive units 200 serially connected to the same. Note that the phrase "tentative blockage" is used for excluding not only the drive unit 200 where the power failure is considered to have actually occurred but also the drive units 200 connected downstream of the relevant drive unit 200 and virtually incapable of performing the command process regardless of existence/non-existence of power failures from the target of issuing commands, but recording using other phrases may also be performed.

FIG. 19 shows another exemplary configuration of the power failure check table 1500 which can be utilized in the present embodiment. In the exemplary configuration of FIG. 19, a record "LSI status" is added to the item of status type 1502 which only contained "I/O status" in the exemplary configuration of FIG. 18. In the power failure detection system of the present embodiment, the existence/non-existence of power failures in the respective drive units 200 is detected by monitoring the process result of normal commands (data I/O commands, etc.) issued to the respective paths from the respective MPs 1042. Therefore, after detection of a command process abnormality in one of the paths, it can be considered that no commands are issued to other paths for a long time and, in such a case, it also takes a long time until it is determined that a power failure has occurred and might cause a trouble in the data I/O process. In order to prevent such an inconvenience, in the exemplary configuration including the power failure check table 1500 of FIG. 19, in a case where the entire check result related to the I/O status of the power failure check table 1500 is not recorded even after a predetermined period of time has elapsed after an MP 1042 has detected a command process abnormality indicating a possible power failure on a specific path, a power failure check dedicated command (for example, an inquiry command of a predetermined protocol) is issued to a path whose check result is not recorded, and whether the response from the drive I/F LSI 2016 in charge in the drive unit 200 is normal or not is recorded in the item of the "LSI status" in the path unit abnormality existence/non-existence record 1503. In the example of FIG. 19, the symbol "*" indicates that this "LSI status" shows abnormality for the paths D, F, and H.

The power failure check tables 1500 shown in FIGS. 20 and 21 includes the same configurations as those of FIGS. 18 and 19, respectively. However, in FIG. 20, "OK" indicating that the I/O status related to the storage drive A22 (202) of the path B is normal is recorded for the drive unit 2. This indicates that the data I/O process on the storage drive A22 performed by the MP 1042 using the path B has succeeded. In this case, since at least an access failure to the storage drive A21 using the path A is determined not to have occurred due to the power failure in the drive unit 2, the data I/O process for the storage drive A21 is to be retried. In this case, as recorded in the item of the blockage information 1520 of FIG. 20, the data I/O process for the drive units 200 of the drive unit 2 and subsequent drive units is performed in a normal manner. In the example of FIG. 21, similarly, since the power failure check dedicated command for the drive unit 2 using the path F is determined to have been performed in a normal manner, the LSI status of the drive unit 2 of the path F is recorded as "OK" and thus power failure has not occurred at least in the drive unit 2, and the data I/O process for the drive units 200 of the drive unit 2 and subsequent drive units is performed in a normal manner.

Note that, in the present embodiment, in a case where a failure of the data transfer process has occurs in a certain period of time for all the paths including the path A which has caused an initiation of the process of determining whether a power failure has occurred or not, it is determined that there is a power failure in the drive units subsequent to the destination drive unit 200 for the path A which has caused the initiation (drive unit 2). Further, it can be configured in such a manner that, among the eight paths shown as an example in FIG. 4, a data transfer failure detected in paths other than alternate paths such as the path E for the path A may be a condition for determining whether a power failure has occurred in the relevant drive unit 200. In other cases, it can be configured in such a manner that detection of a data transfer failure in a path whose destination is a storage drive 202 incapable of configuring an ECC (Error Check and Correction) group over a specific drive board 201, for example, the paths A, B, E, and F in FIG. 4 may be a condition for determining whether a power failure has occurred in the relevant drive unit 200.

Description of Power Failure Detection Process of the Present Embodiment

Now, the power failure detection process performed in the exemplary power failure detection system of the above-mentioned present embodiment will be described with reference to the related flowcharts.

Example 1

Firstly, the power failure detection process of the first example of the present embodiment will be described. FIG.

Figure 22:
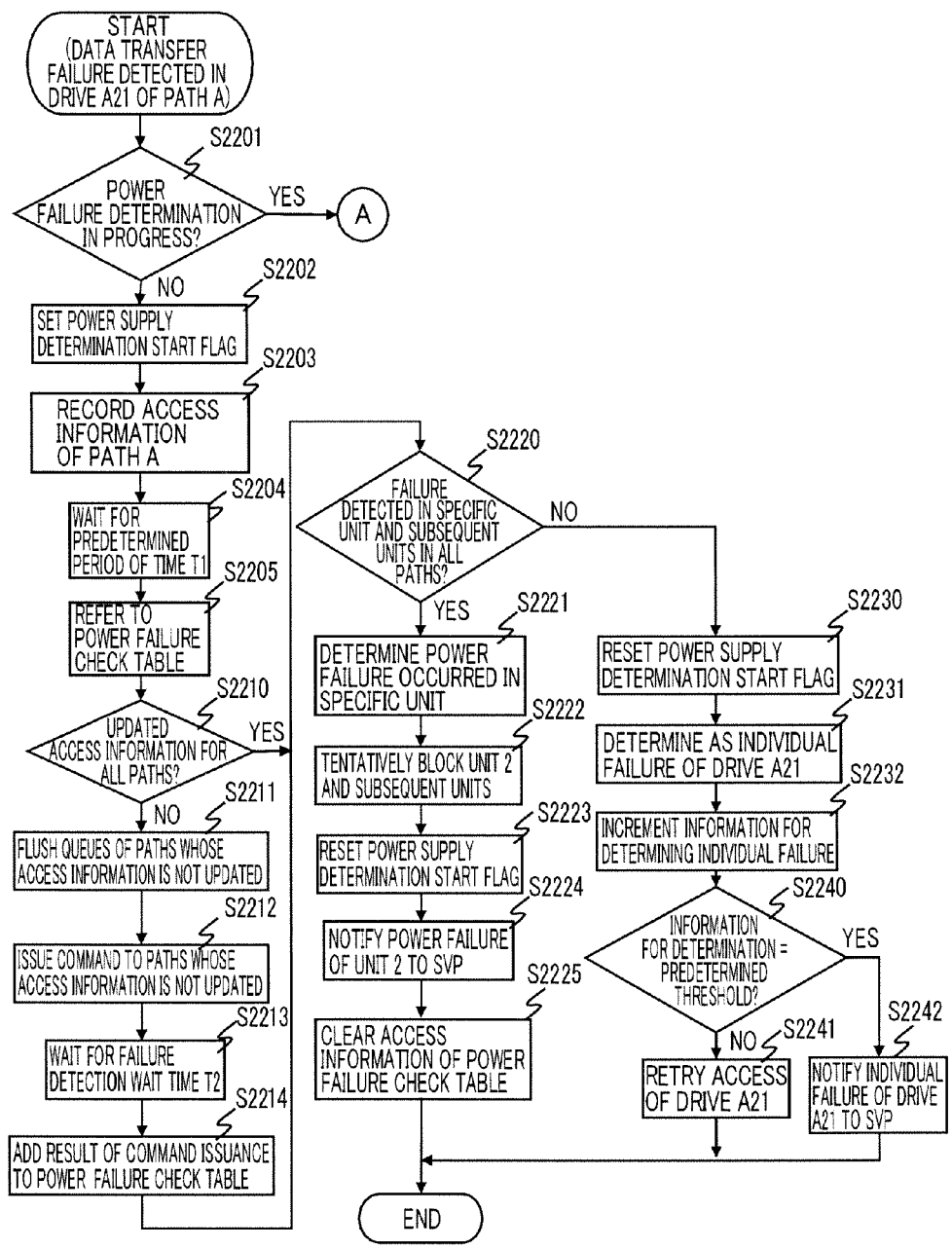
FIG. 22 is a diagram showing an example of a power failure detection processing flow performed by the first MP which has detected the data transfer failure.

22 shows an exemplary power failure detection process flow of Example 1. Example 1 is a process flow performed by each MP 1042 performing the data I/O process and the like with each drive unit 200 and initiated when an abnormality in the data I/O command process issued by the MP 1042 itself is detected. In the example of FIG. 22, the power failure detection processing flow is initiated when an abnormality is notified for the processing of a data I/O command issued by a certain MP 1042 to the storage drive A21 of the drive unit 2 via the path A. Note that the power failure detection process of the present embodiment is specifically performed by each MP 1042 executing a software which functions as the failure detection unit 1301 of the power supply monitoring unit 1300 shown in FIG. 10. Hereinafter, when a description is made with the failure detection unit 1301 being the subject, it implies that the MP 1042 performs the relevant software. Furthermore, the symbol "S" prefixed to each step in the process flow is an abbreviation for "step".

Figure 23:
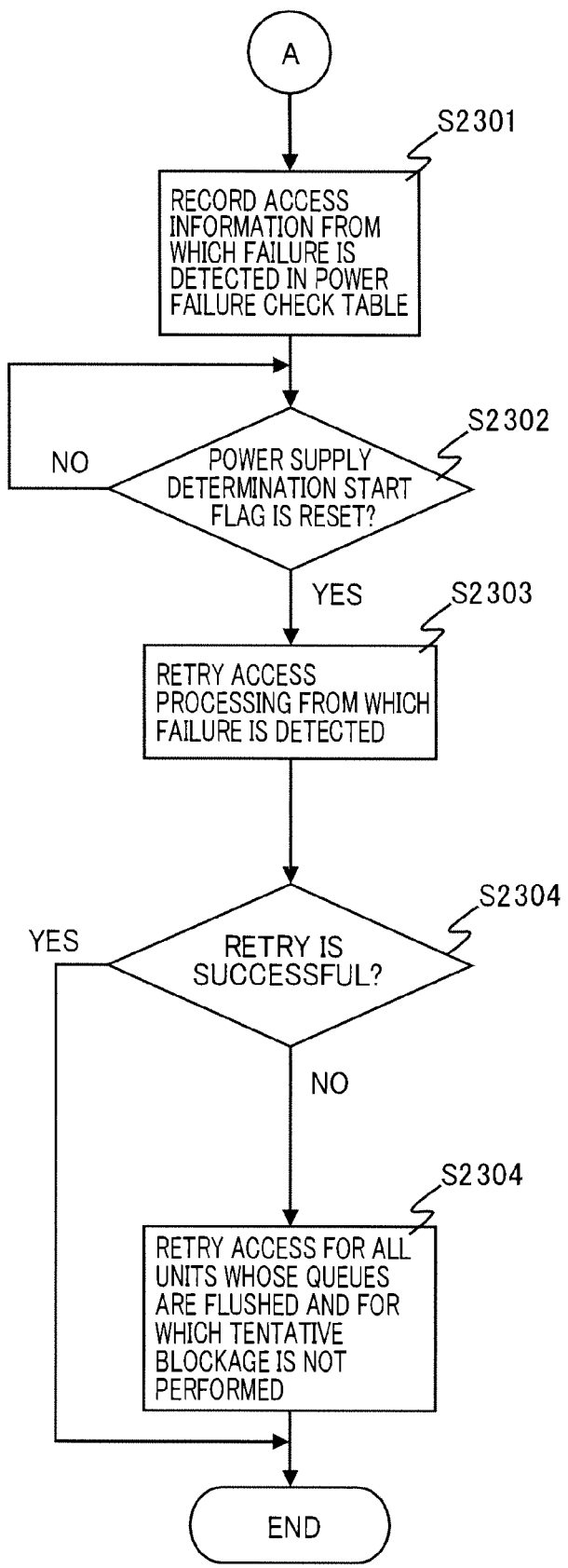
FIG. 23 is a diagram showing an example of a power failure detection process flow performed by the second and subsequent MPs which have detected the data transfer failure.

Firstly, the failure detection unit 1301 refers to a power supply determination start flag set in, for example, an appropriate storage area of the shared memory of the memory board 103, determines whether the power failure detection process flow has already been started or not, that is, whether the power supply determination is in progress (S2201) and, if it is determined that the process is already in progress (S2201, Yes), proceeds to the process flow of FIG. 23 which is a process to be performed by the MP 1042 which has detected a data I/O command process abnormality which indicates a possible power failure.

If it is determined that the power failure determination is not in progress (S2201, No), the failure detection unit 1301 sets the power supply determination start flag so that other MPs 1042 can recognize that the failure detection unit 1301 itself is going to perform the subsequent power failure detection process (S2202). Next, the failure detection unit 1301 accesses the power failure check table 1500, and records a symbol "*" indicating that a data I/O command process abnormality exists in the path and in the storage drive 202 (A21 of the path A in this example) where the failure detection unit 1301 itself has detected the abnormality in the data I/O command processing (S2203).

Next, the failure detection unit 1301 waits for a period of time T1 which is an estimated time after the other MPs 1042 had confirmed that the power supply determination start flag is set until the recording of the data I/O command processing result in the power failure check table 1500 is finished, and then refers to the power failure check table 1500 (S2204, S2205).

Next, the failure detection unit 1301 determines whether process abnormalities of data I/O command are recorded in the power failure check table 1500 or not for all the paths, i.e., paths A to H in the present example (S2210). In the present example, determination is performed by checking whether a symbol "*" is recorded in the item of the I/O status for any of the paths B to H. If it is determined that a data I/O command process abnormality is recorded in paths A to H (S2210, Yes), the process proceeds to S2220 described later.

If it is determined that there is a path for which no data I/O command process abnormality is recorded (S2210, No), the failure detection unit 1301 performs, for the path for which no data I/O command processing result is recorded, a process of flushing the respective data queues 10541 by clearing all the data stored in the data queue 10541 of the drive control I/F 1054 (S2211). At this point, the flushing process is also performed in the same way for the data queues on the of the drive units 200 side provided in the drive I/F board 2014, which are not shown in FIG. 15. This data queue flushing process is to ensure that, in case a power failure check dedicated command is issued in the next step and later steps, the relevant dedicated command is performed without delay in the respective MPs 1042, and that the existence/non-existence of data I/O command process abnormalities in the path can be immediately determined. Note that, instead of flushing the data queues 10541 and others, the speeding-up of the abnormality existence/non-existence determination may also be achieved by issuing a check dedicated command which has a higher priority in processing than the normal data I/O commands. Furthermore, in a case where a certain degree of delay is allowed in the power failure detection process for the storage apparatus 10, the configuration may be such a configuration in which the flushing of data queues 10541 and others is omitted.

In the present example, the failure detection unit 1301 issues the power failure check dedicated command for a path for which no data I/O command process result is recorded (S2212), waits for a period of time T2 until the command process result is returned (S2213), and then records the dedicated command process result in the power failure check table 1500 (S2214).

Next, the failure detection unit 1301, determines whether a data I/O command processing abnormality is recorded or not in the power failure check table 1500 for the specified drive unit 200 and subsequent drive units of all the paths, if it is determined that a data I/O command process abnormality is recorded in the specified drive unit 200 and subsequent drive units (S2220, Yes), determines that a power failure has occurred in the first drive unit 200 (the drive unit 2 in the example of FIG. 18) (S2221) and, by recording "tentative blockage" in the item of blockage information 1520 of the power failure check table 1500 for the respective drive units 200 coupled to the relevant drive unit 200 and subsequent drive units, prevents the respective MPs 1042 from performing the data I/O processing (S2222).

Next, the failure detection unit 1301 resets the power supply determination start flag which is set in the shared memory (S2223), notifies the SVP 300 that a power failure has occurred in the drive unit 2 (S2224), clears the data I/O command process result recorded in the power failure check table 1500, and ends the process (S2225). After that, the respective MPs 1042 continue to perform the data I/O process by utilizing the drive units 200 which are not tentatively blocked (only the drive unit 1 in the present example). If tentative blockage is performed for all the drive units 200 including the drive unit 1, the data I/O process of the storage apparatus 10 cannot be performed, and therefore a maintenance operation such as replacement of the drive units 200 will be performed in response to the notification result of the SVP 300.

Returning to S2220, if it is determined that no data I/O command process abnormality is recorded in the specified drive unit 200 and subsequent drive units of all the paths (S2220, No), the failure detection unit 1301 resets the power supply determination start flag (S2230), determines that what is detected is not the power failure of the drive unit 2 but an individual failure which has occurred in the storage drive A21 which is the destination of the data I/O of the path A (S2231), and increments the numeral value data recorded in the individual failure determination information which is provided, for example, in the shared memory (S2232). The failure detection unit 1301 sets a predetermined threshold for individual failure determination information, and in a case where the numeral value data serving as the individual failure determination information reaches the predetermined threshold (S2240, Yes), considers that a certain failure has occurred in the relevant storage drive A21, notifies this to the SVP 300, and terminates the process (S2242). As for the storage drive A21 (202) where a failure is determined to exist, the maintenance operation such as replacement of the drives and the like is performed in accordance with what is notified to the SVP 300.

If it is determined that the numeral value data serving as the individual failure determination information has not reached the specified threshold (S2240, No), the failure detection unit 1301 retries the data I/O for the storage drive A21 via the path A, and terminates the process (S2241).

According to the above-mentioned power failure detection processing of Example 1, since the respective MPs 1042 can perform the power failure existence/non-existence determination process for the drive units 200 in accordance with the normal data I/O command process result, the power failure existence/non-existence of the drive units 200 can be detected accurately and immediately without providing a special circuit or others for the power failure detection process, and the storage apparatus 10 can be configured using the general-purpose drive units 200. Furthermore, in a case where failure existence/non-existence of the drive units 200 is determined using the power failure check dedicated command, if a configuration is provided in such a manner that the flushing process is performed for the data queues 10541 in the drive control I/F 1054 or the dedicated command whose priority in the processing is higher than the normal data I/O commands is used, the power failure detection can be performed more rapidly.

FIG. 23 shows a process flow performed by MPs 1042 other than the first MP 1042 which has detected the data I/O command process abnormality described in FIG. 22 (in the present example, the MP 1042 performing data I/O for the storage drive A21 of the drive unit 2 using path A). If it is determined at S2201 of the power failure detection process flow in FIG. 22 that the power failure determination is already in progress (S2201, Yes), the relevant MP 1042 proceeds to the process flow in FIG. 23, and records the data I/O command process result detected for the path of which the MP 1042 is in charge in the power failure check table 1500 (S2301).

Next, the failure detection unit 1301 checks the shared memory and waits for the power supply determination start flag to be reset (S2302, No). If it is determined that the power supply determination start flag is reset (S2302, Yes), the failure detection unit 1301 retries the data I/O process using the path in which the failure was detected, and performs a determination on the result (S2303, S2304). If it is determined that the retry was successful (S2304, Yes), the failure detection unit 1301 terminates the process. If it is determined that the retry was not successful (S2304, No), the failure detection unit 1301 retries the data I/O for all the drive units 200 which can be determined from the power failure check table 1500 that the flushing process has been performed and the tentative blockage is not set for the corresponding data queues 10541, and terminates the process.

According to the above-mentioned configuration, existence/non-existence of the data I/O command process abnormality of the respective paths can be summed up rapidly by the MPs 1042 other than the MP 1042 which has detected the data I/O command process abnormality.

Example 2

Figure 24:
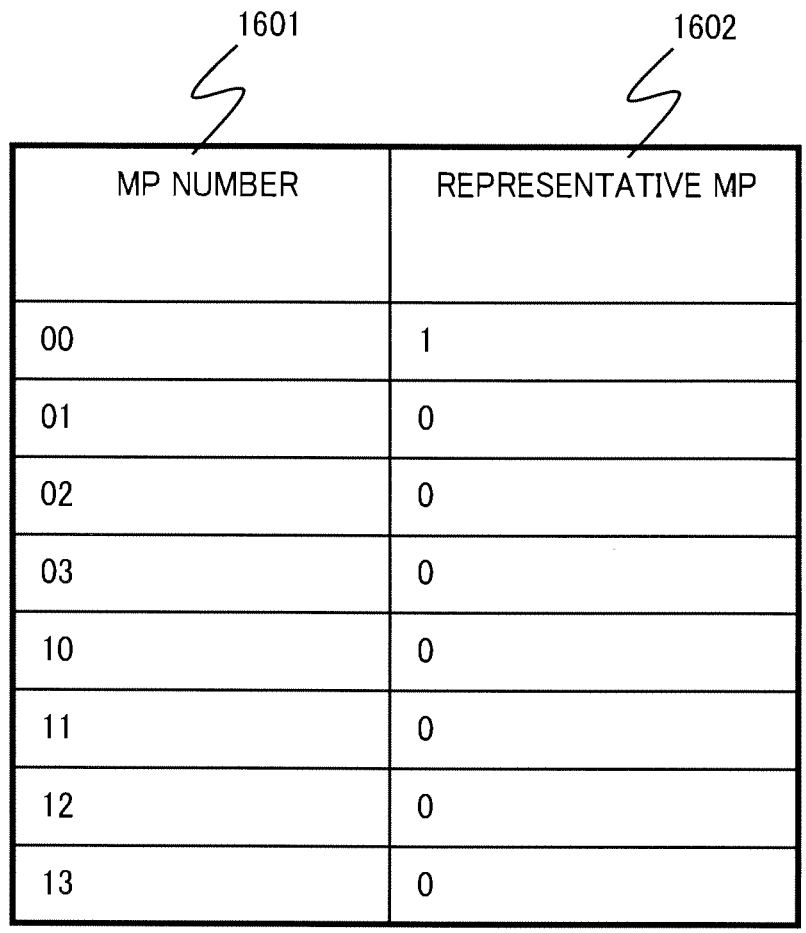
FIG. 24 is a diagram showing an exemplary configuration of a representative MP management table 1600.

Next, a process performed in Example 2 of the present embodiment will be described. In Example 2, unlike Example 1, the MP 1042 performing the power failure detection process is determined in advance as the representative MP 1042 (representative operational device) and set in the representative MP management table 1600. FIG. 24 shows a configuration example of the representative MP management table 1600. In the example of FIG. 24, the items of the MP number 1601 which is an identification symbol for identifying each MP 1042 and the representative MP 1602 which is a flag indicating that the relevant MP is the representative MP are made to correspond to each other and recorded. In the example of FIG. 24, an MP 00 belonging to the cluster 1 in the controller 100 is set as the representative MP 1042 which performs the power failure detection processing and, if the other MPs 1042 (MP 01 to MP 13) detect a data I/O command process abnormality before the MP 00, the relevant MP 1042 provides a notification requesting for a power failure detection process to the MP 00 serving as the representative MP 1602. Note that the representative MP 1602 may be any of the MPs 1042 specified in advance, or may be specified by a dynamic setting such as changing in accordance with the process loads of the respective MPs 1042.

Figure 25:
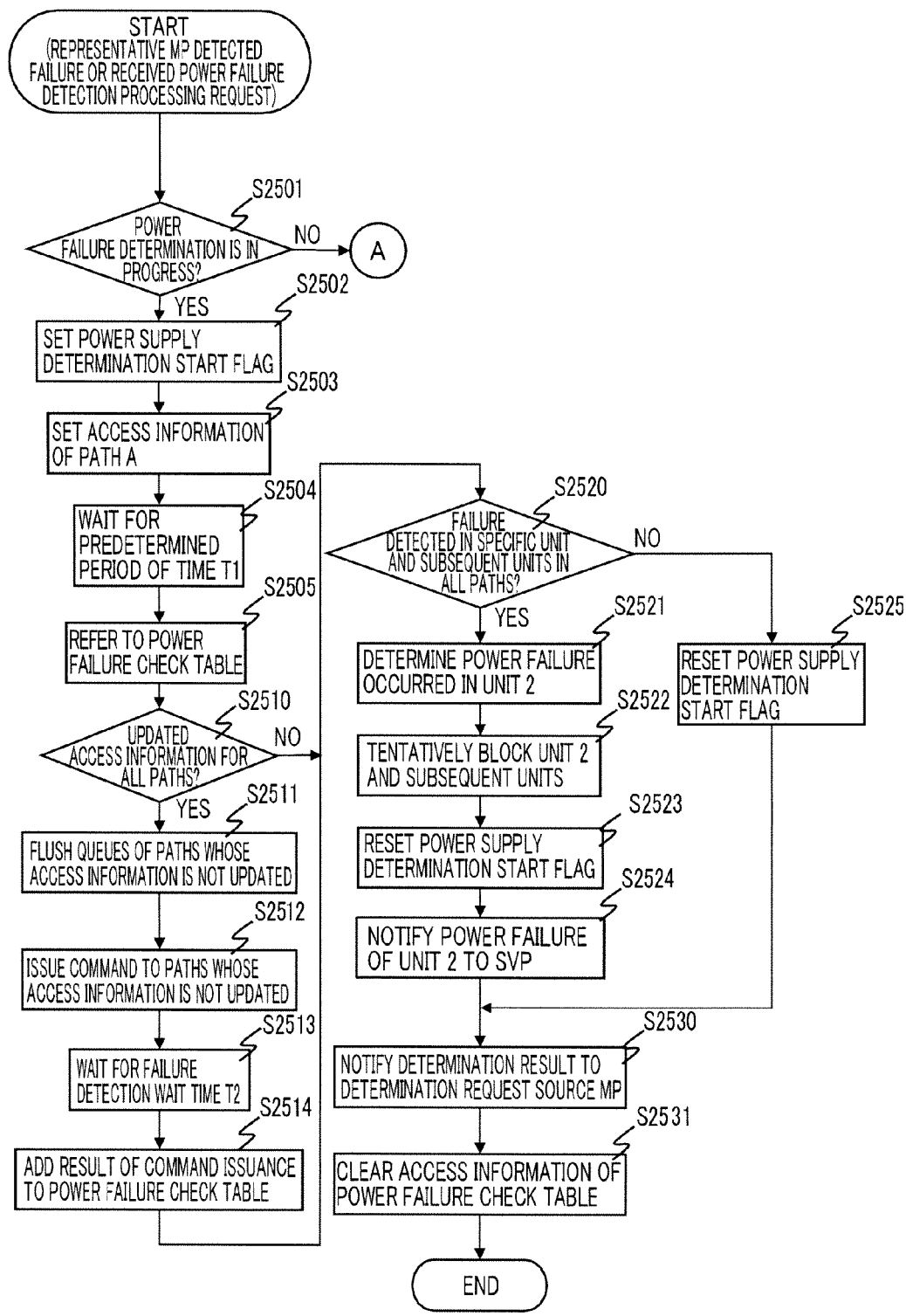
FIG. 25 is a diagram showing an example of the power failure detection process flow performed by a representative MP.

FIG. 25 shows an example of the process flow in a case where a data I/O command process abnormality is detected by the MP 1042 which is the representative MP 1602 and the power failure detection processing is performed in response thereto. As the example of the process flow of FIG. 25 is substantially the same as the case of FIG. 22, the configuration which is different from the case of FIG. 22 will be described as a specific process by the representative MP 1602.

The trigger for starting the processing flow in FIG. 25 is that the representative MP 1602 itself detects a data I/O command process abnormality or receives a request for performing the power failure detection process from the MPs 1042 other than the representative MP 1602 which has detected the abnormality. Firstly, processes from S2501 to S2520 are similar to those from S2201 to S2220 in FIG. 22. If it is determined at S2520 that no failure in the identified drive unit 200 of all the paths has been detected (S2520, No), the failure detection unit 1301 resets the power supply determination start flag provided in the shared memory, and proceeds to the process to S2530 (S2525). At S2530, the process for notifying the existence/non-existence of the power failure detection to the request source MP 1042 which has requested for the performing of the detection process is performed. The other MPs 1042 which have received the notification will perform the process described below in accordance with the notification.

According to the above-mentioned configuration where the representative MP 1602 is selected in advance, an effect of reducing an influence of the process load of the power failure detection process on the original data I/O command process of the respective MPs 1042 can be achieved.

Figure 26:
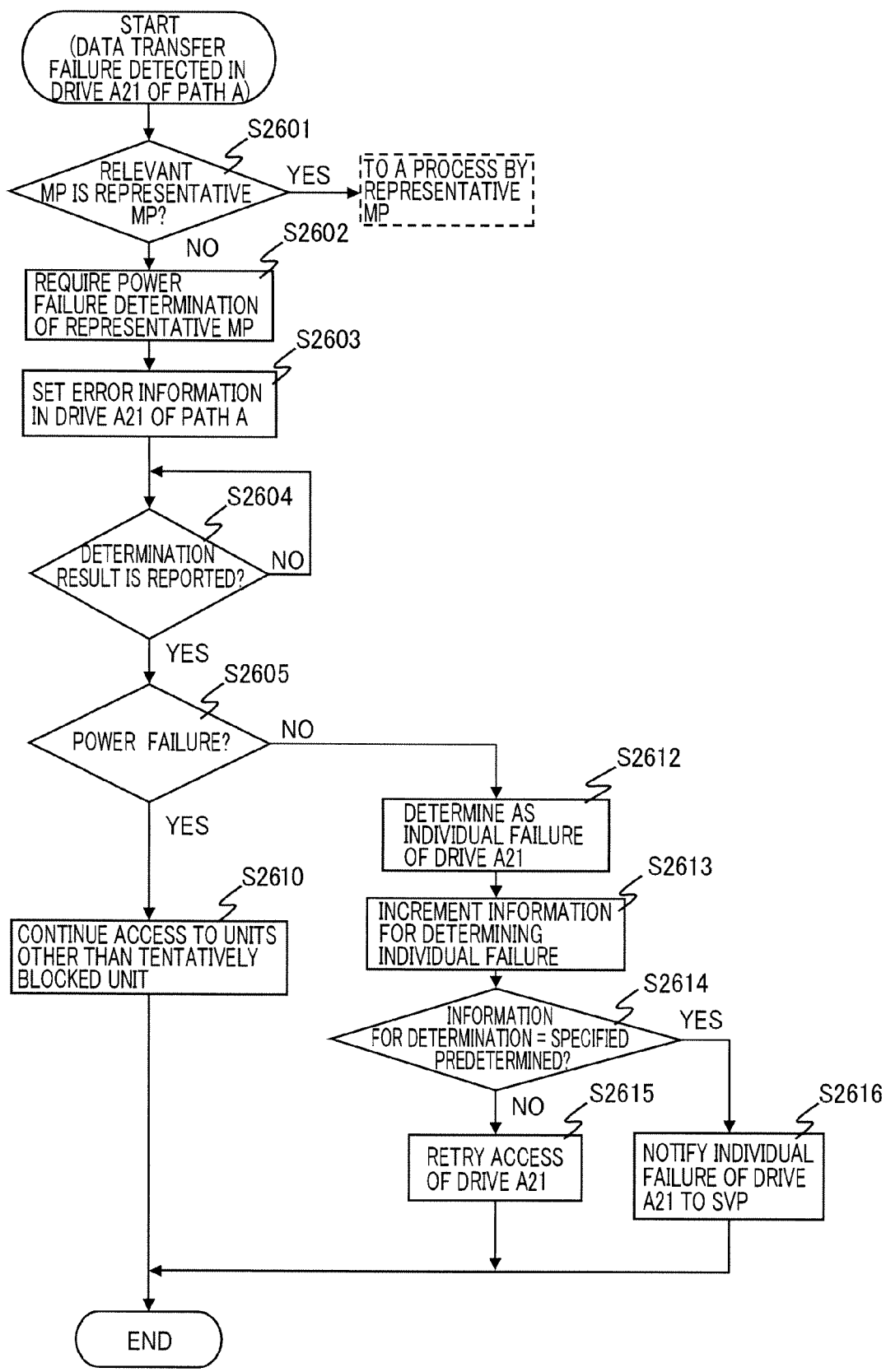
FIG. 26 is a diagram showing an example of the power failure detection process flow performed by MPs other than the representative MP.

Next, a power failure detection process flow will be described which is performed, in a case where the MP 1042 other than the representative MP 1602 has detected a data I/O command process abnormality in Example 2, by the relevant MPs 1042. FIG. 26 shows an example of the relevant detection process flow. The process flow of FIG. 26 includes a configuration partly the same as the process flow example of Example 1 shown in FIG. 23. Firstly, the MP 1042 which has detected a data I/O command process abnormality refers to the representative MP management table 1600, and determines whether the relevant MP 1042 itself is the representative MP 1602 or not (S2601) and, if it is determined that relevant MP 1042 is the representative MP 1602 (S2601, Yes), performs the process as the representative MP 1602 in accordance with the process flow of FIG. 25.

If it is determined that the relevant MP 1042 is not the representative MP 1602 at S2601 (S2601, No), the failure detection unit 1301 requests for the power failure detection process to the representative MP 1602 specified in the representative MP management table 1600, and records a symbol "*" into the power failure check table 1500 in a field indicating the path and the destination storage drive 202 where the data I/O command process abnormality is detected (S2603).

Next, the failure detection unit 1301 waits for the determination result to be notified from the representative MP 1602 (S2604, No) and, if it is determined that the determination result is notified (S2604, Yes), further determines whether the content of the notification indicates that a power failure has occurred or not (S2605). If it is determined that the result indicating that the power failure has occurred is notified (S2605, Yes), the failure detection unit 1301 continues to perform the data I/O process using the drive units 200 other than the drive unit 200 which is tentatively blocked (S2610).

If it is determined that the result does not indicate a power failure (S2605, No), the failure detection unit 1301 performs the processes from S2612 to S2616 corresponding to the steps S2231 onwards in FIG. 22, and performs the process for the individual failure of the destination storage drive 202 of the path of which itself is in charge.

According to the above-mentioned configuration, since the MPs 1042 other than the representative MP 1602 can cause the representative MP 1602 to perform the power failure detection process in a case where a data I/O command process abnormality is detected, an influence on the normal data I/O process which the should be performed by the relevant MPs in the power failure detection process can be reduced.

Description of Power Supply Recovery Process of the Present Embodiment

Next, the power supply recovery process will be described which is performed in a case where the power failure is restored after the power failure detection process of the present embodiment has been performed.

Example 1

Figure 27:
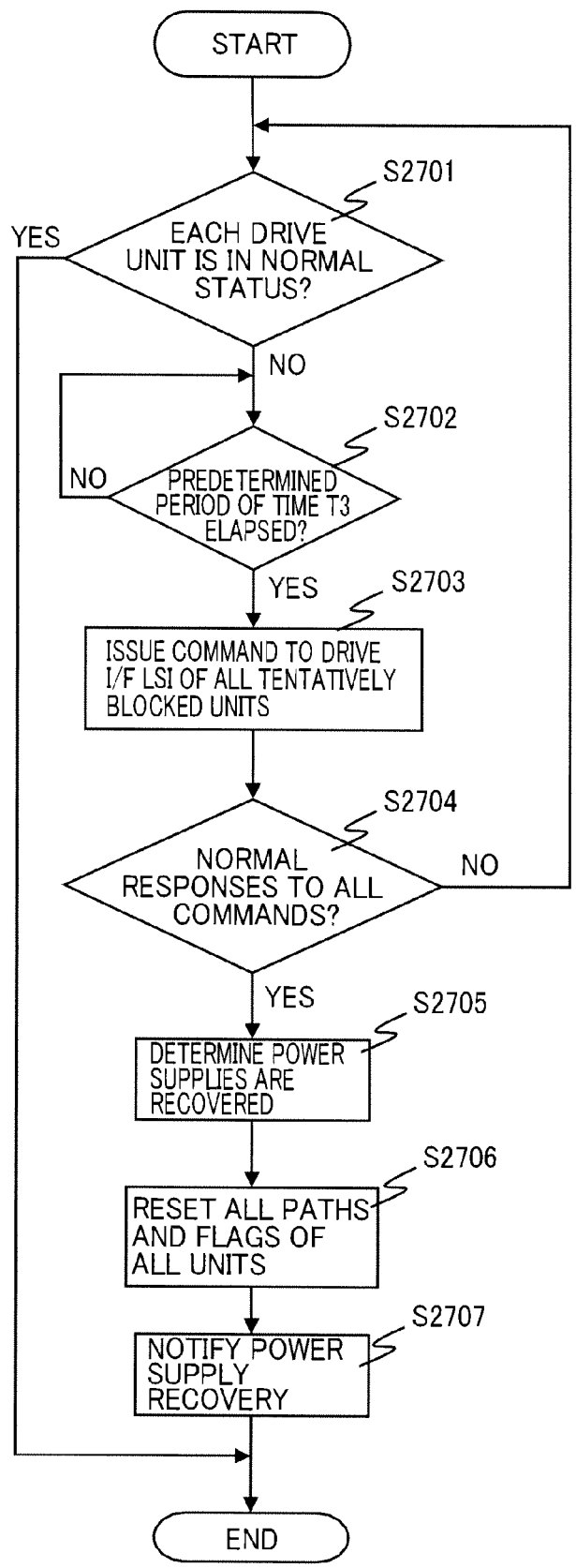
FIG. 27 is a diagram showing an example of a power failure recovery process flow.

FIG. 27 shows an example of a power supply recovery processing flow of the configuration of the Example 1 where each of the respective MPs performs the power failure detection process. The power supply recovery process is performed by the MPs 1042 run software which achieves the function of the failure recovery unit 1302 of the power supply monitoring unit 1300 shown in FIG. 10. This is also the similar in the Example 2 described later.

The MP 1042 which has performed the power failure detection process in FIG. 22 refers to the power failure check table 1500 at an appropriate time interval, determines whether or not the drive unit is in the normal status in which normal use is recorded in the item of the blockage information 1520 of each drive unit 200 (S2701) and, if it is determined that the drive unit is in the normal status (S2701, Yes), terminates the process as no power failure has occurred in each drive unit 200.

In a case where normal use is not recorded for all the drive units 200, in other words, in a case where it is determined that the tentative blockage is performed for a part of drive units 200 (S2701, No), the failure recovery unit 1302 waits for a predetermined period of time T3 to elapse (S2702, No) and, if it is determined that the predetermined period of time T3 has elapsed (S2702, Yes), issues a normal data I/O command to the drive I/F LSI 2016 of each drive unit 200 for which tentative blockage is recorded (S2703).

Next, the failure recovery unit 1302 determines whether or not normal responses are returned to all the commands issued at S2703 (S2704) and, if it is determined that there are the drive units 200 which cannot acquire normal responses for a part of the commands (S2704, No), returns the process to S2701 to determine whether or not the relevant command process abnormality is caused by a power failure.

If it is determined that normal responses are returned to all the issued commands (S2704, Yes), the failure recovery unit 1302 determines that the power supplies of the respective drive units 200 have been recovered (S2705), clears the failure record related to all the paths and all the drive units 200 recorded in the power failure check table 1500 (S2706), notifies the SVP 300 of the power supply recovery, and terminates the process (S2707).

According to the above-mentioned power supply recovery process of Example 1, it is possible to rapidly determine the power supply recovery of the respective drive units 200 and cancel the tentative blockage status and thus the deterioration of the data I/O performance as the storage apparatus 10 can be suppressed.

In the example in FIG. 27, the power supply is determined to have recovered in the case where normal responses are acquired from all the drive I/F LSIs 2016 existing in the tentatively blocked drive unit 200. However, the respective drive units 200 may be configured in such a manner that the power supply is determined to have recovered in a case where a normal command response is acquired for a set of minimum storage drives 202 necessary for the data I/O, among the storage drives 202 forming a RAID group or an ECC group. In this case, an improvement in the operation rate as the storage apparatus 10 can be expected.

FIG. 28 shows an example of the drive configuration management table 1700 by taking a drive unit 1 of the present embodiment (the first drive unit 200 coupled to the controller 100) as an example.

The drive configuration management table 1700 in FIG. 28 includes items such as a drive unit ID 1701 for recording an identification symbol identifying a drive unit 200, a path ID 1702 for recording an identification symbol identifying a path of data I/O processing, a drive I/F board ID 1703 for recording an information symbol identifying a drive I/F board 201, a drive ID 1704 for recording an identification symbol identifying a storage drive 202, and an ECC configuration 1705 for recording the configuration of an ECC group of each drive unit 200. In the example of FIG. 28, as the ECC configuration 1705 includes a configuration of 7D+P, if it is allowed to operate the relevant drive unit 200 in, for example, a read mode which does not take the data redundancy into consideration and if a command response from path A to G is determined to be normal, the drive unit 1 can be treated as recovered. As for RAID groups or ECC groups other than this example, the operation rate can be improved by performing a similar drive management.

Example 2

Figure 29:
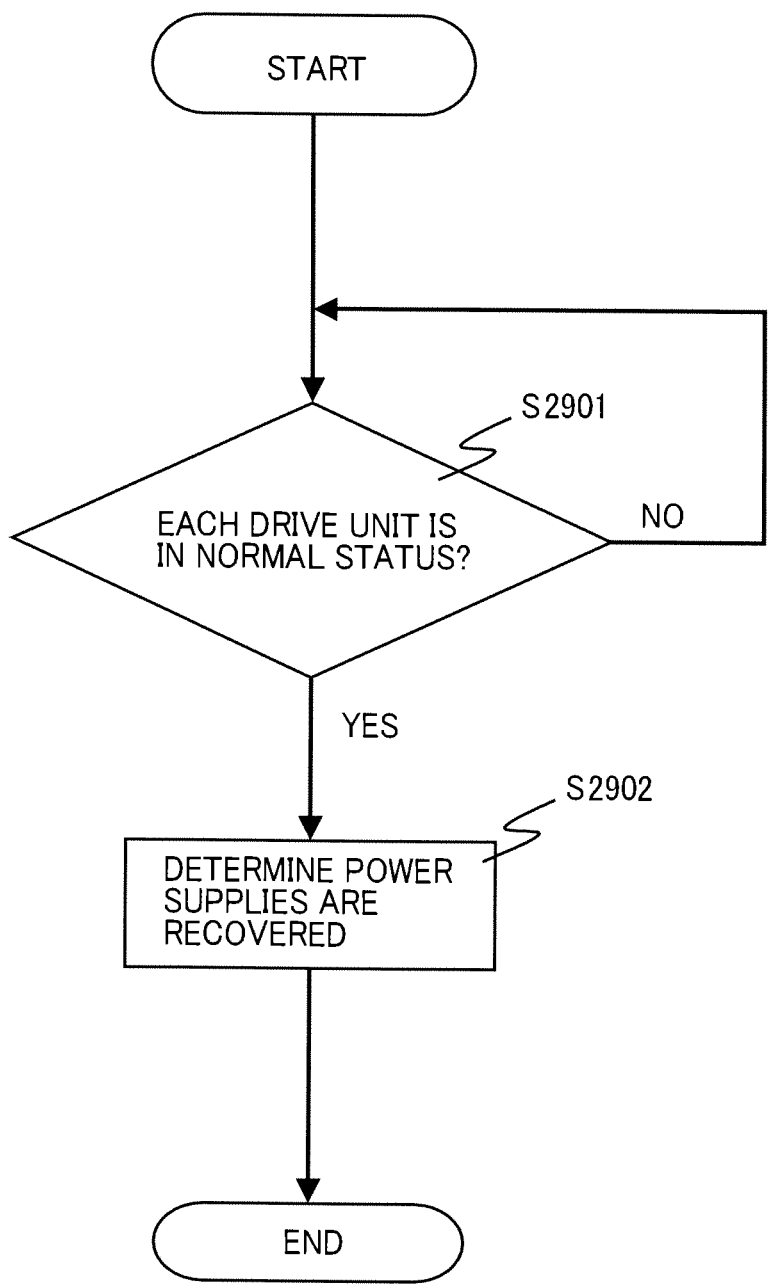
FIG. 29 is a diagram showing an example of the power failure recovery process flow.

Next, a power supply recovery process in the configuration of Example 2 will be described in which the representative MP 1602 performing the power failure detection process is specified among the MPs 1042. Since the power supply recovery process flow by the representative MP 1602 is similar to that of the case of the Example 1 whose example is shown in FIG. 27, illustration and description of the processing flow are omitted. FIG. 29 shows an example of the power supply recovery process flow by the MPs 1042 other than the representative MP 1602.

The failure recovery unit 1302 performed by MPs 1042 firstly refers to the power failure check table 1500 at a predetermined time interval, and waits for the item of the blockage information 1520 which records each drive unit 200 to indicate a normal use (S2901, No). If it is determined that the normal use is recorded in the blockage information 1520 for each drive unit 200 in the power failure check table 1500 (S2901, Yes), the MPs 1042 determine that the power failure of the drive unit 200 has been recovered, and terminates the process (S2902).

According to the above-mentioned power supply recovery process of the Example 2, as in the case of Example 1, it is possible to rapidly determine the power supply recovery of the respective drive units 200 and cancel the tentative blockage status and thus the deterioration of the data I/O performance as the storage apparatus 10 can be suppressed.

In the foregoing, the present invention has been described with reference to the embodiment thereof and, according to the storage apparatus and the power failure detection method of the storage apparatus of the present embodiment, technical effects described below can be obtained.

Since the normal data I/O command process for storage drives 202 is utilized for detecting power failures of the drive units 200, it is not necessary to provide a dedicated power supply monitoring circuit for detecting power failures, the peripheral circuits of the same, and a dedicated communication line, the failure rate as the storage apparatus can be reduced and the production cost can also be reduced.

Since the time which is set considering the delay time after the MPs 1042 has issued commands until receiving the processing status in the storage drives 202 is used as a determination time for power failure determination, false detection of power failures can be reduced and thus the possibility of the unnecessary data I/O processing performance deterioration and the system shutdown can be reduced.

Since the existence/non-existence of power failure occurrence is detected for every drive unit 200, the range of performing the blockage processing for terminating the data I/O process by the MPs 1042 can be minimized, and the performance reduction as the storage apparatus 10 can be minimized.

Since power failure detection is performed by the normal data I/O process, the determination is possible without clearing the data stored in the data queues 10541 in the drive control I/F 1054, and the number of command retries by the MPs 1042 and the number of processing accesses by the MPs 1042 can be reduced. Furthermore, for the paths with lower command process density, power failure detection can be performed more rapidly by performing the dedicated check command after flushing the data queues 10541 or performing the dedicated check command whose priority in processing is higher than normal data I/O commands.

Though the present embodiment was described above, the above-mentioned embodiment is merely for the ease of understanding of this invention and not for limited interpretation of this invention. This invention also comprises any changes and modifications and this invention includes equivalents within the spirit and scope hereof.

The invention claimed is:

1. A storage apparatus comprising:
a drive unit device including a plurality of storage drives a drive interface unit and a power supply unit, the storage drives being configured to provide a physical storage area for creating a logical storage area to be used by an external apparatus, the drive interface unit being configured to input and output data to and from the storage drives, the power supply unit being configured to supply operation power to the storage drives and the drive interface unit;
a storage controller including a plurality of processing units and a drive control interface unit, the processing units being configured to perform a data input/output process via the drive interface unit, the data input/output process including a process of writing data from the external apparatus into the storage drives and a process of reading data out of the storage drives, the drive control interface unit being configured to issue a command to the drive interface unit in response to a request from each of the processing units;
a failure existence/non-existence recording part configured to record, for every attempt of each of the plurality of the processing units to perform the data input/output process via a plurality of data paths which are communication paths for performing data transfer to and from the drive interface unit of the drive unit device, whether the relevant data input/output process was successful for each of the data paths; and
a failure detection unit configured to perform a power failure detection process which, in a case where one of the plurality of processing units has determined that the data input/output process with the drive interface unit has not been performed successfully, determines whether a result of the data input/output process performed by each of the other processing units has been recorded in the failure existence/non-existence recording part within a predetermined period of time after an abnormality of the relevant data input/output process has been recorded in the failure existence/non-existence recording part, and, in a case where the first processing unit which has detected the abnormality in the data input/output process has determined that the data input/output process abnormality is recorded in the failure existence/non-existence recording part for all the data paths, provides an instruction to stop the data input/output processes to the drive unit device in which the data input/output process abnormality has been detected and other drive unit devices coupled downstream of the relevant drive unit device, and wherein:
the failure detection unit is configured to look up in the failure existence/non-existence recording part after the predetermined period of time has elapsed and, in a case where it is determined that a data input/output process result for one of the data paths is not recorded, the failure detection unit issues a data input/output process inspection command to a relevant data path and records a process result of the relevant command into the failure existence/non-existence recording part;
the drive control interface unit is provided with a data queue in which a command issued by the processing unit is sequentially and temporarily stored, the failure detection unit being configured to delete, before issuing the data input/output process inspection command, all the data stored in the data queue provided for a data path whereto the command is to be issued;
in a case where it is determined that the abnormality in the data input/output process is not recorded in the failure existence/non-existence recording part for any of the drive unit devices downstream of the specific drive unit device for every one of the data paths, the failure detection unit determines that there is an abnormality in the storage drive which is a destination of the data path for which the data input/output process abnormality has been recorded and accumulatively record a number of abnormal recordings for the relevant storage drive;
the storage apparatus is provided with a failure restoration unit configured to perform a power supply restoring process in which, in a case where the processing unit which has performed a function of the failure detection unit looks up in the failure existence/non-existence recording unit and determines that the data input/output process is stopped for one of the drive unit devices, the data input/output process inspection command is issued to the data path to the drive interface unit provided in the relevant drive unit device and, in a case where all of the issued commands are determined to have been processed successfully, it is determined that a power failure detected by the failure detecting unit has been restored;

the plurality of storage drives provided in the drive unit device forms a combination arranged to achieve a predetermined purpose including one of providing a redundancy in data storage and performing error correction related to data input/output, and, the failure detection unit determines that, in a case where the data input/output process abnormality has been detected for one of the drive unit devices on the data path in such a manner that the combination cannot be formed, a power failure has occurred in the relevant drive unit device; and the plurality of storage drives provided in the drive unit device forms a combination arranged to achieve a predetermined purpose including one of providing a redundancy in data storage and performing error correction in data input/output, and, the failure restoration unit determines that, in a case where the data path can perform the data input/output process in such a manner that the combination can be at least formed for one of the drive unit devices, the power failure in the relevant drive unit device has been restored.

2. The storage apparatus according to claim 1, wherein the storage controller is configured in such a manner that the plurality of processing units includes a representative processing unit which is specified in advance as the processing unit configured to perform the power failure detecting process and, in a case where the representative processing unit has detected the data input/output process abnormality at first, the representative processing unit performs the power failure detecting process and, in a case where the processing unit other than the representative processing unit has detected the data input/output process abnormality at first, the relevant processing unit sends the representative processing unit a notification to perform the power failure detecting process.

3. The storage apparatus according to claim 1, wherein the plurality of storage drives provided in the drive unit device forms a combination arranged to achieve a predetermined purpose including one of providing a redundancy in data storage and performing error correction related to data input/output, and, the failure detection unit determines that, in a case where the data input/output process abnormality has been detected for one of the drive unit devices on the data path in such a manner that the combination cannot be formed, a power failure has occurred in the relevant drive unit device.

4. A storage apparatus comprising:
a drive unit device including a plurality of storage drives, a drive interface unit and a power supply unit, the storage drives being configured to provide a physical storage area for creating a logical storage area to be used by an external apparatus, the drive interface unit being configured to input and output data to and from the storage drives, the power supply unit being configured to supply operation power to the storage drives and the drive interface unit;
a storage controller including a plurality of processing units and a drive control interface unit, the processing units being configured to perform a data input/output process via the drive interface unit, the data input/output process including a process of writing data from the external apparatus into the storage drives and a process of reading data out of the storage drives, the drive control interface unit being configured to issue a command to the drive interface unit in response to a request from each of the processing units;
a failure existence/non-existence recording part configured to record, for every attempt of each of the plurality of the processing units to perform the data input/output process via a plurality of data paths which are communication paths for performing data transfer to and from the drive interface unit of the drive unit device, whether the relevant data input/output process was successful for each of the data paths; and
a failure detection unit configured to perform a power failure detection process which, in a case where one of the plurality of processing units has determined that the data input/output process with the drive interface unit has not been performed successfully, determines whether a result of the data input/output process performed by each of the other processing units has been recorded in the failure existence/non-existence recording part within a predetermined period of time after an abnormality of the relevant data input/output process has been recorded in the failure existence/non-existence recording part, and, in a case where the first processing unit which has detected the abnormality in the data input/output process has determined that the data input/output process abnormality is recorded in the failure existence/non-existence recording part for all the data paths, provides an instruction to stop the data input/output processes to the drive unit device in which the data input/output process abnormality has been detected and other drive unit devices coupled downstream of the relevant drive unit device, and
wherein the failure detection unit is configured to look up in the failure existence/non-existence recording part after the predetermined period of time has elapsed and, in a case where it is determined that a data input/output process result for one of the data paths is not recorded, the failure detection unit issues a data input/output process inspection command to a relevant data path and records a process result of the relevant command into the failure existence/non-existence recording part.

5. The storage apparatus according to claim 4, wherein the drive control interface unit is provided with a data queue in which a command issued by the processing unit is sequentially and temporarily stored, the failure detection unit being configured to delete, before issuing the data input/output process inspection command, all the data stored in the data queue provided for a data path whereto the command is to be issued.

6. The storage apparatus according to claim 4, wherein the drive control interface unit is provided with a data queue in which a command issued by the processing unit is sequentially and temporarily stored, and the failure detecting unit issues, a command having a higher execution priority than a normal data input/output command stored in the data queue as a data input/output detecting command.

7. The storage apparatus according to claim 4, wherein the storage controller is configured in such a manner that the plurality of processing units includes a representative processing unit which is specified in advance as the processing unit configured to perform the power failure detecting process and, in a case where the representative processing unit has detected the data input/output process abnormality at first, the representative processing unit performs the power failure detecting process and, in a case where the processing unit other than the representative processing unit has detected the data input/output process abnormality at first, the relevant processing unit sends the representative processing unit a notification to perform the power failure detecting process.

8. The storage apparatus according to claim 4, wherein the plurality of storage drives provided in the drive unit device forms a combination arranged to achieve a predetermined purpose including one of providing a redundancy in data storage and performing error correction related to data input/output, and, the failure detection unit determines that, in a case where the data input/output process abnormality has been detected for one of the drive unit devices on the data path in such a manner that the combination cannot be formed, a power failure has occurred in the relevant drive unit device.

9. A storage apparatus comprising:
 a drive unit device including a plurality of storage drives, a drive interface unit and a power supply unit, the storage drives being configured to provide a physical storage area for creating a logical storage area to be used by an external apparatus, the drive interface unit being configured to input and output data to and from the storage drives, the power supply unit being configured to supply operation power to the storage drives and the drive interface unit;
 a storage controller including a plurality of processing units and a drive control interface unit, the processing units being configured to perform a data input/output process via the drive interface unit, the data input/output process including a process of writing data from the external apparatus into the storage drives and a process of reading data out of the storage drives, the drive control interface unit being configured to issue a command to the drive interface unit in response to a request from each of the processing units;
 a failure existence/non-existence recording part configured to record, for every attempt of each of the plurality of the processing units to perform the data input/output process via a plurality of data paths which are communication paths for performing data transfer to and from the drive interface unit of the drive unit device, whether the relevant data input/output process was successful for each of the data paths; and
 a failure detection unit configured to perform a power failure detection process which, in a case where one of the plurality of processing units has determined that the data input/output process with the drive interface unit has not been performed successfully, determines whether a result of the data input/output process performed by each of the other processing units has been recorded in the failure existence/non-existence recording part within a predetermined period of time after an abnormality of the relevant data input/output process has been recorded in the failure existence/non-existence recording part, and, in a case where the first processing unit which has detected the abnormality in the data input/output process has determined that the data input/output process abnormality is recorded in the failure existence/non-existence recording part for all the data paths, provides an instruction to stop the data input/output processes to the drive unit device in which the data input/output process abnormality has been detected and other drive unit devices coupled downstream of the relevant drive unit device, and
 wherein in a case where it is determined that the abnormality in the data input/output process is not recorded in the failure existence/non-existence recording part for any of the drive unit devices downstream of the specific drive unit device for every one of the data paths, the failure detection unit determines that there is an abnormality in the storage drive which is a destination of the data path for which the data input/output process abnormality has been recorded and accumulatively record a number of abnormal recordings for the relevant storage drive.

10. The storage apparatus according to claim 9, wherein the storage controller is configured in such a manner that the plurality of processing units includes a representative processing unit which is specified in advance as the processing unit configured to perform the power failure detecting process and, in a case where the representative processing unit has detected the data input/output process abnormality at first, the representative processing unit performs the power failure detecting process and, in a case where the processing unit other than the representative processing unit has detected the data input/output process abnormality at first, the relevant processing unit sends the representative processing unit a notification to perform the power failure detecting process.

11. The storage apparatus according to claim 9, wherein the plurality of storage drives provided in the drive unit device forms a combination arranged to achieve a predetermined purpose including one of providing a redundancy in data storage and performing error correction related to data input/output, and, the failure detection unit determines that, in a case where the data input/output process abnormality has been detected for one of the drive unit devices on the data path in such a manner that the combination cannot be formed, a power failure has occurred in the relevant drive unit device.

12. A storage apparatus comprising:
 a drive unit device including a plurality of storage drives, a drive interface unit and a power supply unit, the storage drives being configured to provide a physical storage area for creating a logical storage area to be used by an external apparatus, the drive interface unit being configured to input and output data to and from the storage drives, the power supply unit being configured to supply operation power to the storage drives and the drive interface unit;
 a storage controller including a plurality of processing units and a drive control interface unit, the processing units being configured to perform a data input/output process via the drive interface unit, the data input/output process including a process of writing data from the external apparatus into the storage drives and a process of reading data out of the storage drives, the drive control interface unit being configured to issue a command to the drive interface unit in response to a request from each of the processing units;
 a failure existence/non-existence recording part configured to record, for even/attempt of each of the plurality of the processing units to perform the data input/output process via a plurality of data paths which are communication paths for performing data transfer to and from the drive interface unit of the drive unit device, whether the relevant data input/output process was successful for each of the data paths; and
 a failure detection unit configured to perform a power failure detection process which, in a case where one of the plurality of processing units has determined that the data input/output process with the drive interface unit has not been performed successfully, determines whether a result of the data input/output process performed by each of the other processing units has been recorded in the failure existence/non-existence recording part within a predetermined period of time after an abnormality of the relevant data input/output process has been recorded in the failure existence/non-existence recording part, and, in a case where the first processing unit which has detected the abnormality in the data input/output process has determined that the data input/output process abnormality is recorded in the failure existence/non-existence recording part for all the data paths, provides an instruction to stop the data input/output processes to the drive unit device in which the data input/output process abnormality has been detected and other drive unit devices coupled downstream of the relevant drive unit device, and wherein the storage apparatus is provided with a failure restoration unit configured to perform a power supply restoring process in which, in a case where the processing unit which has performed a function of the failure detection unit looks up in the failure existence/non-existence recording unit and determines that the data input/output process is stopped for one of the drive unit devices, the data input/output process inspection command is issued to the data path to the drive interface unit provided in the relevant drive unit device and, in a case where all of the issued commands are determined to have been processed successfully, it is determined that a power failure detected by the failure detecting unit has been restored.

13. The storage apparatus according to claim 12, wherein the plurality of storage drives provided in the drive unit device forms a combination arranged to achieve a predetermined purpose including one of providing a redundancy in data storage and performing error correction in data input/output, and, the failure restoration unit determines that, in a case where the data path can perform the data input/output process in such a manner that the combination can be at least formed for one of the drive unit devices, the power failure in the relevant drive unit device has been restored.

14. The storage apparatus according to claim 12, wherein the storage controller is configured in such a manner that the plurality of processing units includes a representative processing unit which is specified in advance as the processing unit configured to perform the power failure detecting process and, in a case where the representative processing unit has detected the data input/output process abnormality at first, the representative processing unit performs the power failure detecting process and, in a case where the processing unit other than the representative processing unit has detected the data input/output process abnormality at first, the relevant processing unit sends the representative processing unit a notification to perform the power failure detecting process.

15. The storage apparatus according to claim 12, wherein the plurality of storage drives provided in the drive unit device forms a combination arranged to achieve a predetermined purpose including one of providing a redundancy in data storage and performing error correction related to data input/output, and, the failure detection unit determines that, in a case where the data input/output process abnormality has been detected for one of the drive unit devices on the data path in such a manner that the combination cannot be formed, a power failure has occurred in the relevant drive unit device.

16. A method of detecting a power failure in a storage apparatus, the storage apparatus being provided with:
a drive unit device including a plurality of storage drives, a drive interface unit and a power supply unit, the storage drives being configured to provide a physical storage area for creating a logical storage area to be used by an external apparatus, the drive interface unit being configured to input and output data to and from the storage drives, the power supply unit being configured to supply operation power to the storage drives and the drive interface unit; and a storage controller including a plurality of processing units and a drive control interface unit, the processing units being configured to perform a data input/output process via the drive interface unit, the data input/output process including a process of writing data from the external apparatus into the storage drives and a process of reading data out of the storage drives, the drive control interface unit being configured to issue a command to the drive interface unit in response to a request from each of the processing units, the method comprising:

recording, for every attempt of each of the plurality of the processing units to perform the data input/output process via a plurality of data paths which are communication paths for performing data transfer to and from the drive interface unit of the drive unit device, whether the relevant data input/output process was successful for each of the data paths; and determining, in a case where one of the plurality of processing units has determined that the data input/output process with the drive interface unit has not been performed successfully, whether a result of the data input/output process performed by each of the other processing units has been recorded in the failure existence/non-existence recording part within a predetermined period of time after an abnormality of the relevant data input/output process has been recorded in the failure existence/non-existence recording part, and, in a case where the first processing unit which has detected the abnormality in the data input/output process has determined that the data input/output process abnormality is recorded in the failure existence/non-existence recording part for all the data paths, providing an instruction to stop the data input/output processes to the drive unit device in which the data input/output process abnormality has been detected and other drive unit devices coupled downstream of the relevant drive unit device, wherein the failure existence/non-existence recording part is looked up after the predetermined period of time has elapsed and, in a case where it is determined that a data input/output process result for one of the data paths is not recorded, a data input/output process inspection command is issued to a relevant data path and a process result of the relevant command is recorded into the failure existence/non-existence recording part.

17. The method according to claim 16, wherein the drive control interface unit is provided with a data queue in which a command issued by the processing unit is sequentially and temporarily stored, and the failure detection unit is configured to delete, before issuing the data input/output process inspection command, all the data stored in the data queue provided for a data path whereto the command is to be issued.

18. The method according to claim 16, wherein in the storage controller, the plurality of processing units includes a representative processing unit which is specified in advance as the processing unit configured to perform the power failure detecting process and, in a case where the representative processing unit has detected the data input/output process abnormality at first, the representative processing unit performs the power failure detecting process and, in a case where the processing unit other than the representative processing unit has detected the data input/output process abnormality at first, the relevant processing unit sends the representative processing unit a notification to perform the power supply detecting process.

19. A method of detecting a power failure in a storage apparatus, the storage apparatus being provided with:
   a drive unit device including a plurality of storage drives, a drive interface unit and a power supply unit, the storage drives being configured to provide a physical storage area for creating a logical storage area to be used by an external apparatus, the drive interface unit being configured to input and output data to and from the storage drives, the power supply unit being configured to supply operation power to the storage drives and the drive interface unit; and
   a storage controller including a plurality of processing units and a drive control interface unit, the processing units being configured to perform a data input/output process via the drive interface unit, the data input/output process including a process of writing data from the external apparatus into the storage drives and a process of reading data out of the storage drives, the drive control interface unit being configured to issue a command to the drive interface unit in response to a request from each of the processing units,
the method comprising:
recording, for every attempt of each of the plurality of the processing units to perform the data input/output process via a plurality of data paths which are communication paths for performing data transfer to and from the drive interface unit of the drive unit device, whether the relevant data input/output process was successful for each of the data paths; and
determining, in a case where one of the plurality of processing units has determined that the data input/output process with the drive interface unit has not been performed successfully, whether a result of the data input/output process performed by each of the other processing units has been recorded in the failure existence/non-existence recording part within a predetermined period of time after an abnormality of the relevant data input/output process has been recorded in the failure existence/non-existence recording part, and, in a case where the first processing unit which has detected the abnormality in the data input/output process has determined that the data input/output process abnormality is recorded in the failure existence/non-existence recording part for all the data paths, providing an instruction to stop the data input/output processes to the drive unit device in which the data input/output process abnormality has been detected and other drive unit devices coupled downstream of the relevant drive unit device,
wherein the storage apparatus is provided with a failure restoration unit configured to perform a power supply restoring process in which, in a case where the processing unit which has performed a function of the failure detection unit looks up in the failure existence/non-existence recording unit and determines that the data input/output process is stopped for one of the drive unit devices, the data input/output process inspection command is issued to the data path to the drive interface unit provided in the relevant drive unit device and, in a case where all of the issued commands are determined to have been processed successfully, it is determined that a power failure detected by the failure detecting unit has been restored.

20. The method according to claim 19, wherein
in the storage controller, the plurality of processing units includes a representative processing unit which is specified in advance as the processing unit configured to perform the power failure detecting process and, in a case where the representative processing unit has detected the data input/output process abnormality at first, the representative processing unit performs the power failure detecting process and, in a case where the processing unit other than the representative processing unit has detected the data input/output process abnormality at first, the relevant processing unit sends the representative processing unit a notification to perform the power supply detecting process.

* * * * *